United States Patent
Goto et al.

(10) Patent No.: US 7,702,420 B2
(45) Date of Patent: Apr. 20, 2010

(54) METHOD FOR MAKING MOBILE UNIT ACCOMPANY OBJECTIVE PERSON

(75) Inventors: Takanori Goto, Toyonaka (JP); Tamao Okamoto, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1004 days.

(21) Appl. No.: 11/174,667

(22) Filed: Jul. 6, 2005

(65) Prior Publication Data
US 2006/0064203 A1    Mar. 23, 2006

(30) Foreign Application Priority Data
Jul. 7, 2004   (JP)   ............... 2004-200245

(51) Int. Cl.
G05B 19/04   (2006.01)
(52) U.S. Cl. ............... 700/247; 700/245; 700/246; 700/250; 700/253; 700/258; 700/259
(58) Field of Classification Search ............... 901/1–50; 700/245–264; 180/19.1, 232; 318/568.1; 382/181
See application file for complete search history.

(56) References Cited

U.S. PATENT DOCUMENTS 7,024,276 B2 * 4/2006 Ito ............... 700/245

FOREIGN PATENT DOCUMENTS

JP    11-73582    3/1999

OTHER PUBLICATIONS

Sakagami, Y. et al; The intellient Asimo: system overview and integration, Dec. 10, 2002, IEEE, vol. 3, pp. 2478-2483.*
Stanhope S. J. et al. Kinematic-based technique for event time determination during gait, Jul. 1990, vol. 28 No. 4, pp. 355-360.*
Davis L. S. et al., 3-D model-based tracking of humans in action: a multi-view approach, Aug. 6, 2002, IEEE, pp. 73-80.*

* cited by examiner

Primary Examiner—Khoi Tran
Assistant Examiner—Bhavesh V Amin
(74) Attorney, Agent, or Firm—Wenderoth, Lind & Ponack, L.L.P.

(57) ABSTRACT

A method for making a mobile unit accompany an objective person moves the mobile unit in correspondence with movement of the objective person and executes control so that the mobile unit moves along the walking direction of the objective person by detecting the foot landing of the objective person, detecting the walking speed and the walking direction of the objective person, and predicting the predictive walking range of the objective person on the basis of the detected information of the walking direction and the foot landing.

11 Claims, 31 Drawing Sheets

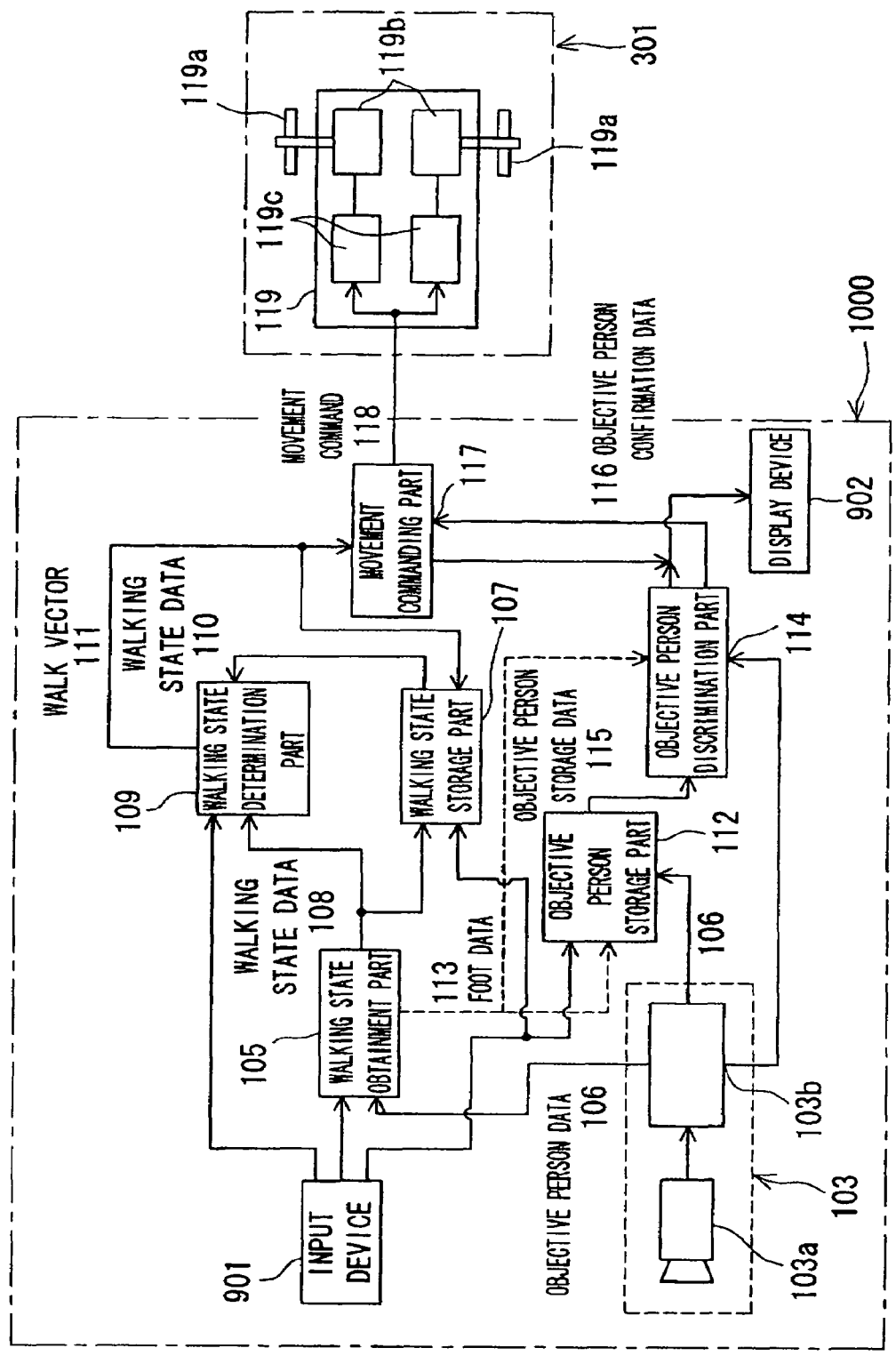

METHOD FOR MAKING MOBILE UNIT ACCOMPANY OBJECTIVE PERSON

BACKGROUND OF THE INVENTION

The present invention relates to a method for making a mobile unit accompany an objective person by means of an accompaniment mobile unit for tracking the objective person and relates more concretely to a method for tracking walk.

As a conventional tracking method and apparatus, there is one that tracks the movement of a person by means of an image input device (refer to Japanese Unexamined Patent Publication No. H11-73582).

The tracking apparatus (ambulatory elder following robot) described in Japanese Unexamined Patent Publication No. H11-73582 is described with reference to FIG. 30.

In FIG. 30, an ambulatory elder tracking robot 1 has a GPS receiver 2, a map database 3, a position detection means 4, a notification means 5, a TV camera 6, an image compression means 7, a discrimination means 8, a behavior disorder detection means 9, an obstacle detection sensor 10, an avoidance motion control means 11, a motor 12, and an antitheft part 13.

The operation of the robot 1 is described in outline as follows. The robot 1 preparatorily stores the image information of an ambulatory elder who is the objective person to be tracked by the tracking robot 1 in an image memory of the discrimination means 8. By receiving and image-processing a pickup image of the objective person from the TV camera 6, the objective person is discriminated on the basis of the height of the head, the waist curve condition, the walking manner, the clothes, and so on of the objective person, and the direction of the imaging of the TV camera 6 is controlled on the basis of a discrimination signal for specifying the objective person from the discrimination means 8 to continue the image-pickup by automatic tracking. Otherwise, the robot 1 tracks the objective person by attaching a small transmitter to the objective person and receiving its sent waves.

However, according to the above conventional technology, the objective person is assumed to be the ambulatory elder whose movement speed is slow, and the discrimination or tracking ability is also limited. Moreover, since the movement of the objective person cannot be predicted, it is sometimes impossible to make discrimination. Particularly, when the objective person suddenly changes his or her movement direction, it is impossible to discriminate the objective person, and it is necessary to attach a compact transmitter to the objective person in order to cope with this. Therefore, there is an issue that track of the objective person is lost when the electric wave situation is degraded.

There is a further issue that the image processing and algorithm become complicated because the tracking is performed by image-processing the whole image of a person.

Accordingly, the present invention has the object of solving the issues of the prior art and providing a method for making a mobile unit accompany an objective person, capable of easily predicting and then tracking the walk of the objective person without any special tool or the like regardless of the age and the movement of the objective person.

SUMMARY OF THE INVENTION

In accomplishing the objects, the present invention is constructed as follows.

According to a first aspect of the present invention, there is provided a method for making a mobile unit accompany an objective person for moving a mobile unit in correspondence with movement of an objective person, the method comprising:

detecting landing of a foot of the objective person;
detecting a walking direction of the objective person; and
executing control so that the mobile unit moves along the walking direction of the objective person by predicting a predictive walking range of the objective person on a basis of detected information of the landing and the walking direction and detecting that the foot of the objective person lands within the predictive walking range through walking of the objective person.

According to a second aspect of the present invention, there is provided the method for making a mobile unit accompany an objective person as defined in the first aspect, wherein when it is detected that the foot of the objective person lands outside of the predictive walking range, control is executed so that the mobile unit stops moving, and thereafter, the foot landing of the objective person is detected again, the walking direction of the objective person is detected again, and the control is executed through the prediction and the detection of the foot landing within the predictive walking range, so as to make the mobile unit accompany the objective person for moving the mobile unit in correspondence with movement of the objective person.

According to a third aspect of the present invention, there is provided the method for making a mobile unit accompany an objective person as defined in the first aspect, wherein the predictive walking range is a sectorial range directed along the walking direction and having a radius R calculated by a following expression from a footstep of the objective person centered on position coordinates of a landed foot of the objective person;

$$\text{Footstep} \times 1.2 \leq \text{radius } R \leq (\text{footstep} + \text{objective person's shoes size}) \times 1.2.$$

According to a fourth aspect of the present invention, there is provided the method for making a mobile unit accompany an objective person as defined in the first aspect, wherein, when the foot landing is detected, the objective person is discriminated, and position coordinates of both feet of the objective person are detected.

According to a fifth aspect of the present invention, there is provided the method for making a mobile unit accompany an objective person as defined in the first aspect, wherein, when the foot landing is detected, both feet of the objective person are detected, and position coordinates of both feet of the objective person are detected.

According to a sixth aspect of the present invention, there is provided the method for making a mobile unit accompany an objective person as defined in the fifth aspect, wherein, when the position coordinates of both feet are detected, a foot of the objective person located at same position coordinates for a time longer than a prescribed time is determined to be a landed foot, and position coordinates of the landed foot of the objective person are stored.

According to a seventh aspect of the present invention, there is provided the method for making a mobile unit accompany an objective person as defined in the sixth aspect, wherein, when the foot of the objective person located at the same position coordinates for a time longer than the prescribed time is determined, the time during which the foot is located at the same position coordinates is set longer than 0.1 seconds.

According to an eighth aspect of the present invention, there is provided the method for making a mobile unit accompany an objective person as defined in the fifth aspect, wherein, when the position coordinates of both feet are detected, the position coordinates of the foot of the objective person landed on a ground are detected, and the detected position coordinates of the foot of the objective person are stored.

According to a ninth aspect of the present invention, there is provided the method for making a mobile unit accompany an objective person as defined in the first aspect, wherein, when the control is executed so that the mobile unit moves along the walking direction of the objective person, a mobile unit movement direction is determined by connecting a midpoint of a line segment that connects both feet of the objective person with a midpoint of a line segment that connects both feet of the objective person at next step from already detected position information of both feet of the objective person, and the mobile unit is moved according to the determined direction.

According to a 10th aspect of the present invention, there is provided the method for making a mobile unit accompany an objective person as defined in the first aspect, wherein, when the mobile unit is controlled to move, the mobile unit is made to move along the walking direction preceding the objective person.

According to an 11th aspect of the present invention, there is provided the method for making a mobile unit accompany an objective person as defined in the first aspect, wherein, when the mobile unit is controlled to move, the mobile unit is made to move along the walking direction postceding the objective person.

According to a 12th aspect of the present invention, there is provided an apparatus for making a mobile unit accompany an objective person for moving a mobile unit in correspondence with movement of an objective person, the apparatus comprising:
   a foot landing detection means for detecting landing of a foot of the objective person;
   a walking direction detection means for detecting a walking direction of the objective person; and
   a control means for executing control so that the mobile unit moves along the walking direction of the objective person by predicting a predictive walking range of the objective person on a basis of detected information of the walking direction and the foot landing and detecting that the foot of the objective person lands within the predictive walking range through walking of the objective person.

According to a 13th aspect of the present invention, there is provided the apparatus for making a mobile unit accompany an objective person as defined in the 12th aspect, wherein the control means executes control so that when it is detected that the foot of the objective person lands outside of the predictive walking range, the mobile unit stops moving, and
   thereafter, the foot landing detection means detects the foot landing of the objective person again, the walking direction detection means detects the walking direction of the objective person again, and the control means executes the control through the prediction and the detection of the foot landing within the predictive walking range, so as to make the mobile unit accompany the objective person for moving the mobile unit in correspondence with movement of the objective person.

According to a 14th aspect of the present invention, there is provided the apparatus for making a mobile unit accompany an objective person as defined in the 12th aspect, wherein the control means comprises a foot landing obtainment part for predicting the predictive walking range of the objective person on a basis of detected information of the walking direction and the foot landing, the predictive walking range being a sectorial range directed along the walking direction and having a radius R calculated by a following expression from a footstep of the objective person centered on position coordinates of a landed foot of the objective person;

$$\text{Footstep} \times 1.2 \leq \text{radius } R \leq (\text{footstep} + \text{objective person's shoes size}) \times 1.2.$$

According to a 15th aspect of the present invention, there is provided the apparatus for making a mobile unit accompany an objective person as defined in the 12th aspect, wherein the foot landing detection means comprises:
   an objective person measurement device including a camera for picking up images of the objective person, and an image processing part for processing the images picked-up by the camera;
   an objective person discrimination part for discriminating the objective person; and
   a both feet position detection means for detecting position coordinates of both feet of the objective person.

According to a 16th aspect of the present invention, there is provided the apparatus for making a mobile unit accompany an objective person as defined in the 12th aspect, wherein the foot landing detection means comprises:
   an objective person measurement device including a camera for picking up images of the objective person, and an image processing part for processing the images picked-up by the camera;
   a both feet position detection means for detecting position coordinates of both feet of the objective person.

According to a 17th aspect of the present invention, there is provided the apparatus for making a mobile unit accompany an objective person as defined in the 16th aspect, wherein the both feet position detection means comprises a means for determining that a foot of the objective person located at same position coordinates for a time longer than a prescribed time is determined to be a landed foot and a storage part for storing position coordinates of the landed foot of the objective person.

According to an 18th aspect of the present invention, there is provided the apparatus for making a mobile unit accompany an objective person as defined in the 17th aspect, wherein, in the means for determining that the foot of the objective person located at the same position coordinates for a time longer than the prescribed time is determined, the time during which the foot is located at the same position coordinates is set longer than 0.1 seconds.

According to a 19th aspect of the present invention, there is provided the apparatus for making a mobile unit accompany an objective person as defined in the 17th aspect, wherein the both feet position detection means comprises a means for determining the foot of the objective person landed on a ground and a storage part for storing position coordinates of the foot of the objective person.

According to a 20th aspect of the present invention, there is provided the apparatus for making a mobile unit accompany an objective person as defined in the 12th aspect, wherein the walking direction detection means comprises a means for determining a mobile unit movement direction by connecting a midpoint of a line segment that connects both feet of the objective person with a midpoint of a line segment that connects both feet of the objective person at next step from already detected position coordinates of both feet of the objective person.

According to a 21st aspect of the present invention, there is provided the apparatus for making a mobile unit accompany an objective person as defined in the 12th aspect, wherein the control means comprises a means for moving the mobile unit along the walking direction by making the mobile unit precede the objective person.

According to a 22nd aspect of the present invention, there is provided the apparatus for making a mobile unit accompany an objective person as defined in the 12th aspect, wherein the control means comprises a means for moving the mobile unit along the walking direction by making the mobile unit postcede the objective person.

With the above construction, it is possible to carry out antecedent tracking or postcedent tracking along the movement direction of the objective person by obtaining information of the foot landing and the walking direction of the objective person, thus specifying the movement direction of the objective person and making a prediction.

According to the method for making the mobile unit accompany the objective person and the apparatus for making the mobile unit accompany the objective person of the present invention, the mobile unit is made to carry out tracking along the walking direction of the objective person while predicting the predictive walking range of the objective person and then confirming that the objective person keeps walking within the predicted range. Therefore, the mobile unit can be moved along the movement direction of the objective person easily and reliably regardless of a sudden movement of tracking.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1A is a block diagram showing the schematic construction of a walk tracking apparatus and a mobile unit equipped with the walk tracking apparatus according to one embodiment of the present invention;

DETAILED DESCRIPTION OF THE PREFERRED EMBODIMENTS

Figure 1B:
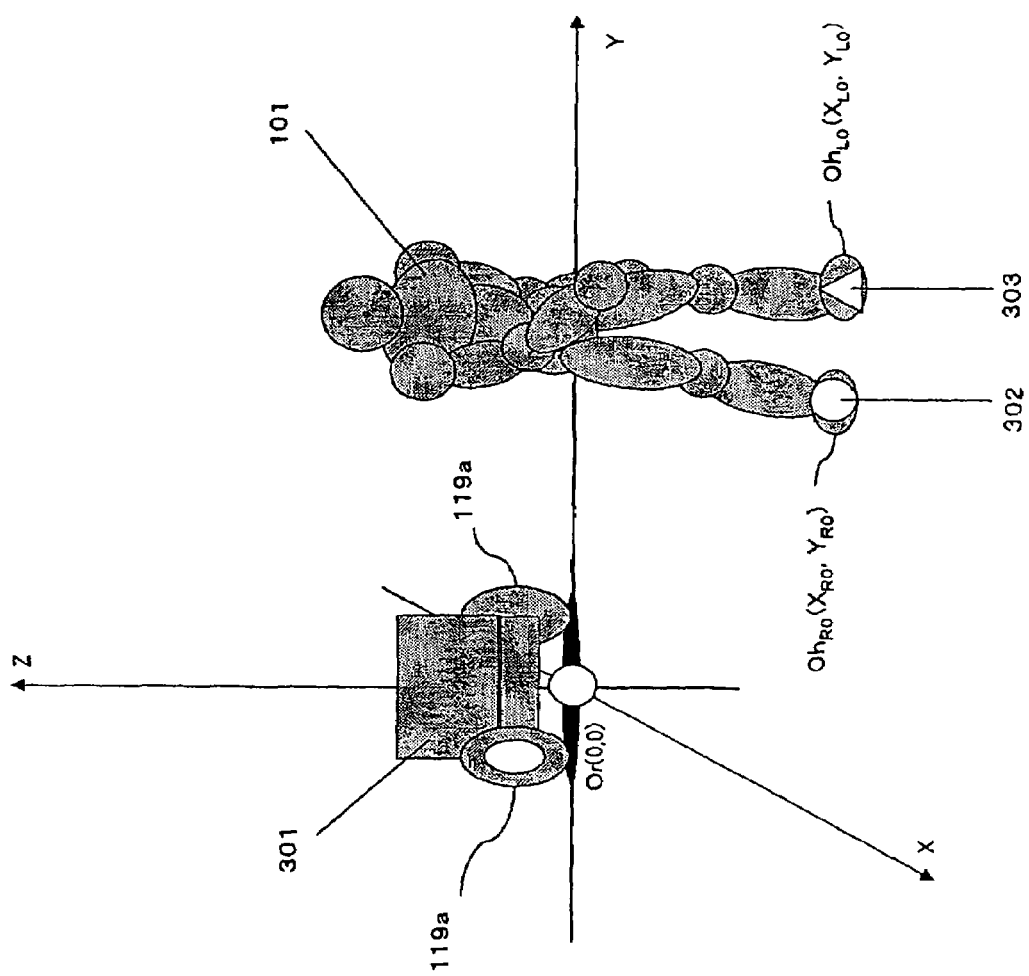
FIG. 1B is an explanatory view showing the mobile unit equipped with the walk tracking apparatus of the above embodiment and an objective person to be tracked.

Before the description of the present invention proceeds, it is to be noted that like parts are designated by like reference numerals throughout the accompanying drawings.

A walk tracking type mobile unit and objective person walk tracking method and apparatus with the mobile unit of one example of the method for making a mobile unit accompany an objective person and apparatus for making a mobile unit accompany an objective person according to one embodiment of the present invention will be described below with reference to FIGS. 1A through 27.

Figure 2:
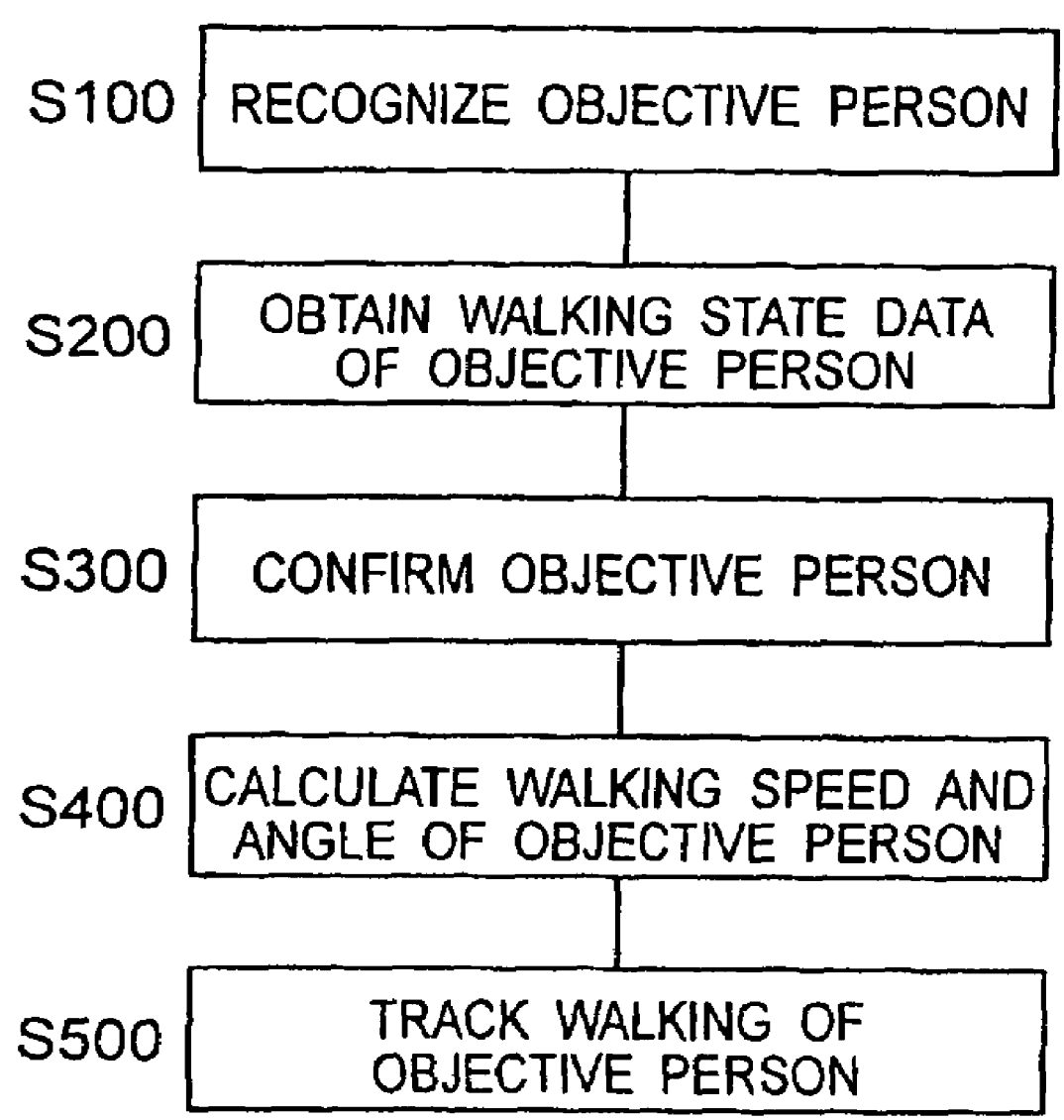
FIG. 2 is a flow chart of the processing steps of an automatic walk tracking method by means of the mobile unit equipped with the walk tracking apparatus of the above embodiment of the present invention.
Figure 6:
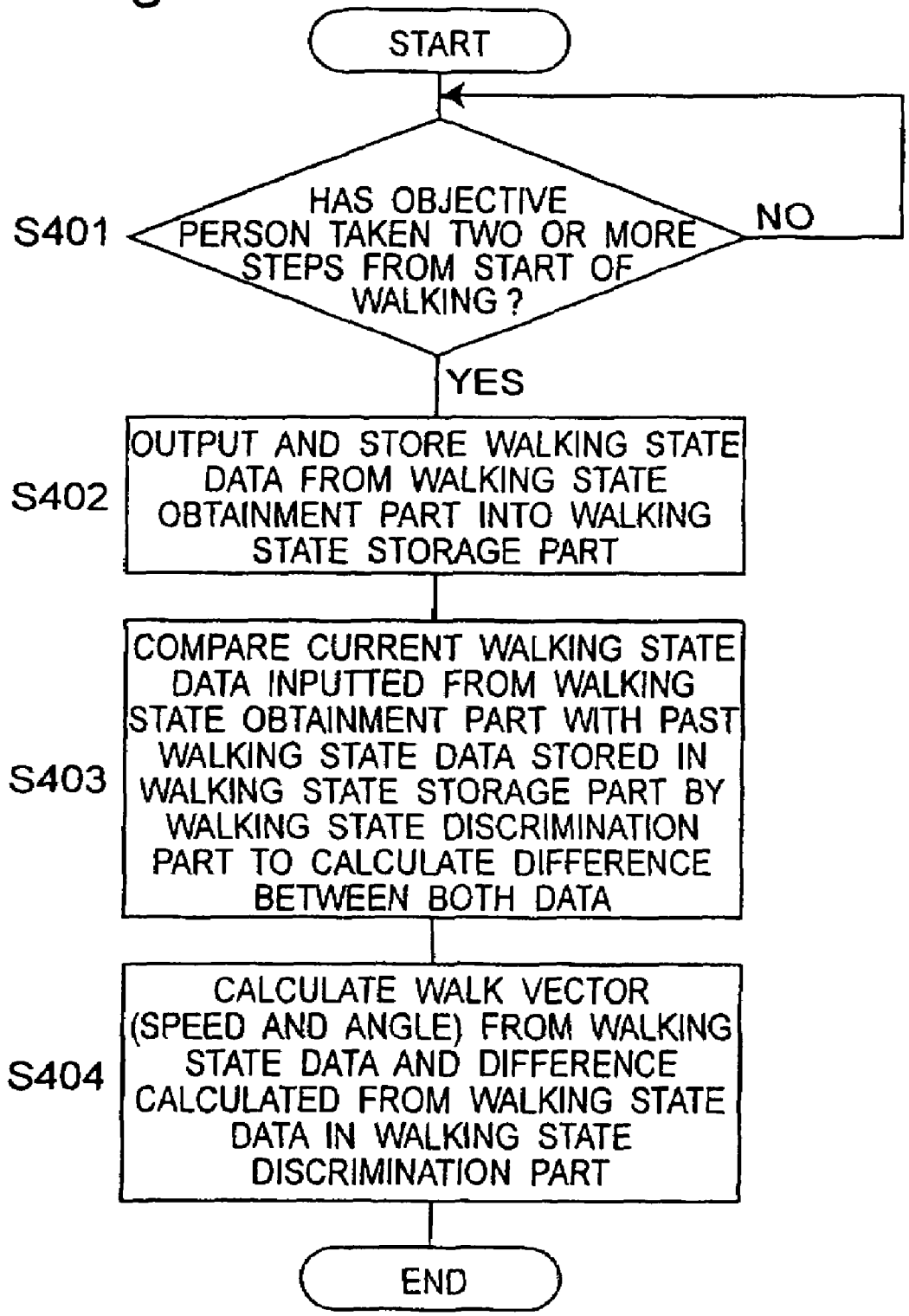
FIG. 6 is a flow chart showing an objective person walking speed and angle calculation process by the walk tracking method by means of the walk tracking apparatus of the above embodiment.
Figure 7:
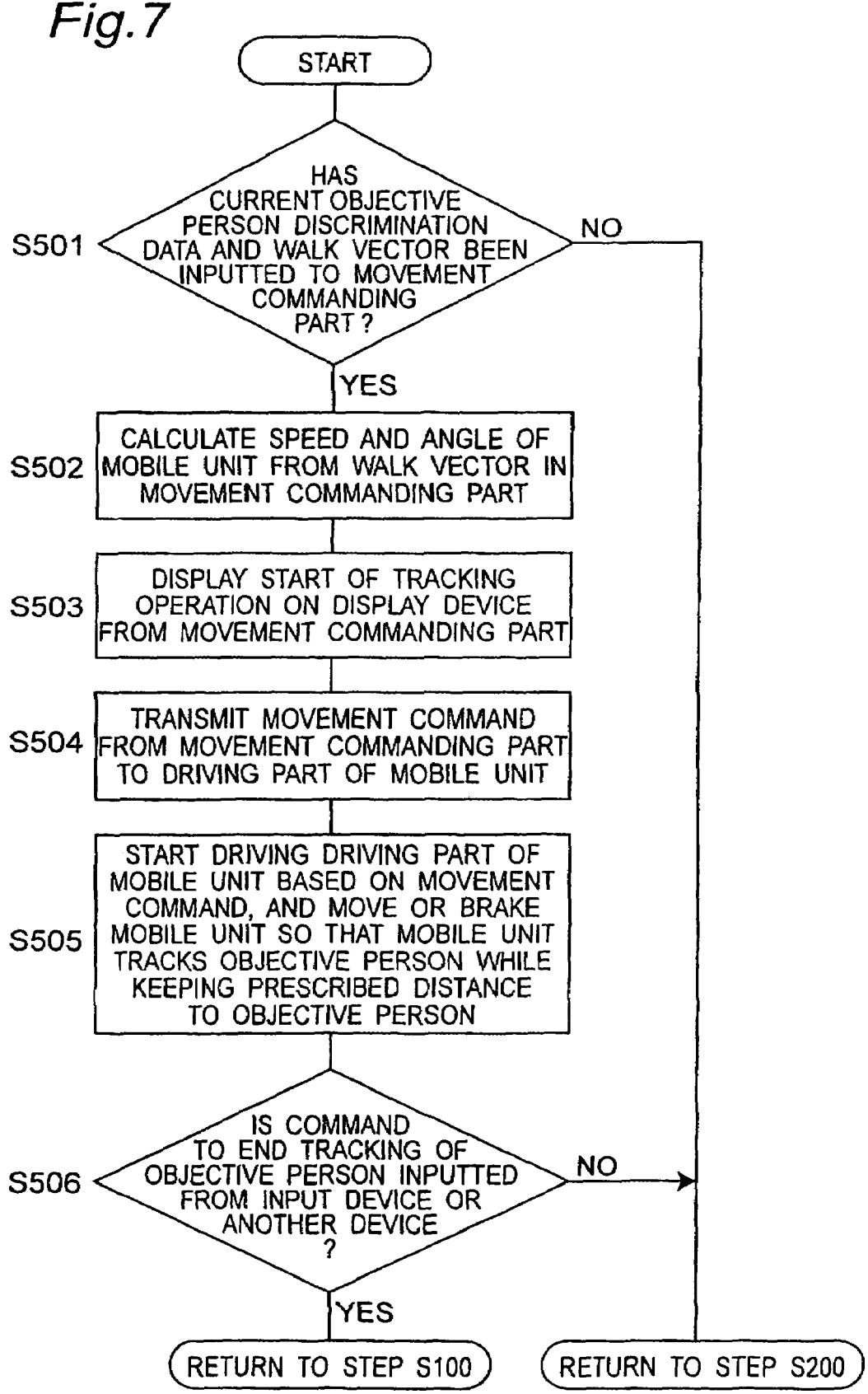
FIG. 7 is a flow chart showing an objective person tracking process by the walk tracking method by means of the walk tracking apparatus of the above embodiment.
Figure 8:
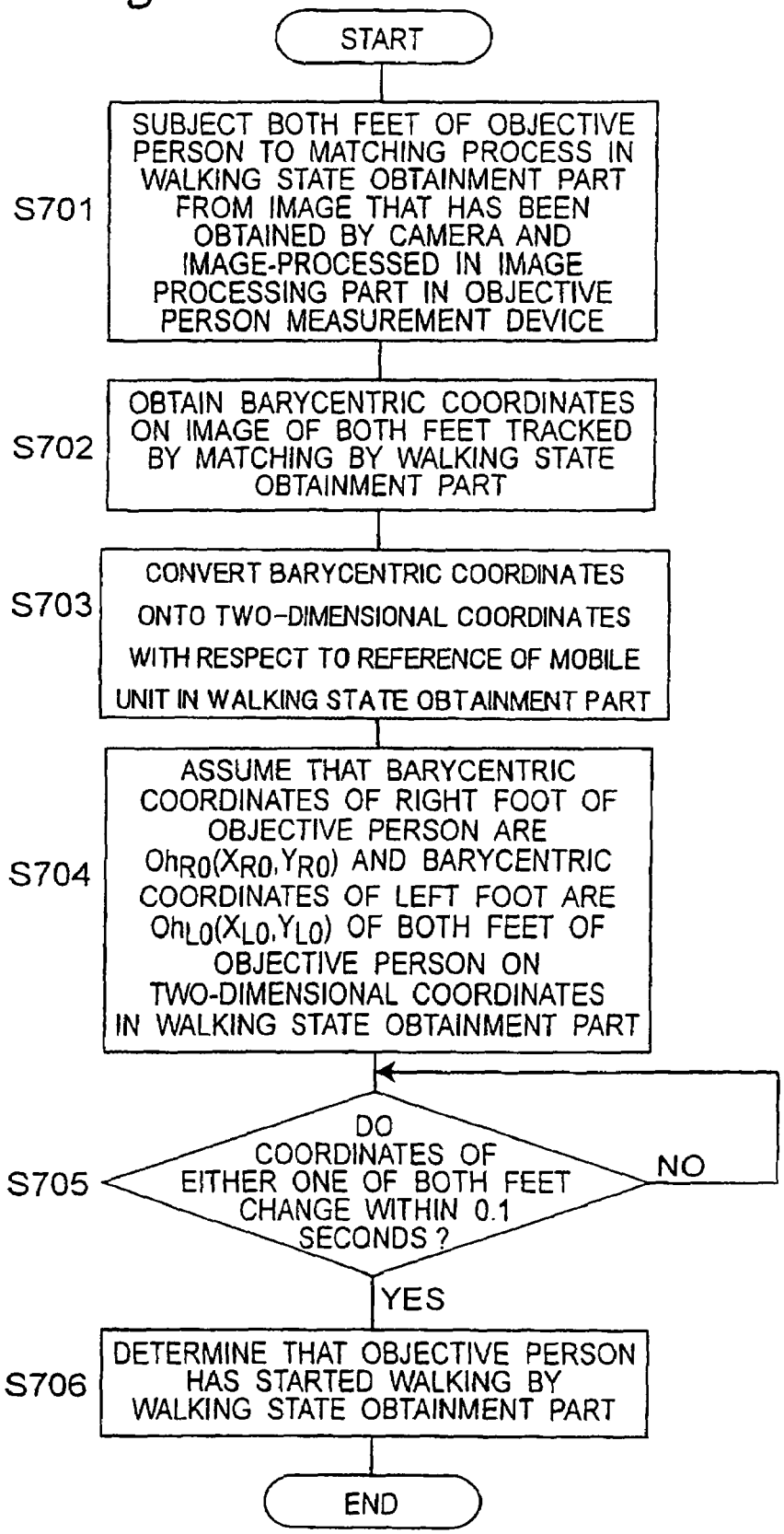
FIG. 8 is a flow chart showing a method for recognizing the start of walking of the objective person by the walk tracking method by means of the walk tracking apparatus of the above embodiment.
Figure 9:
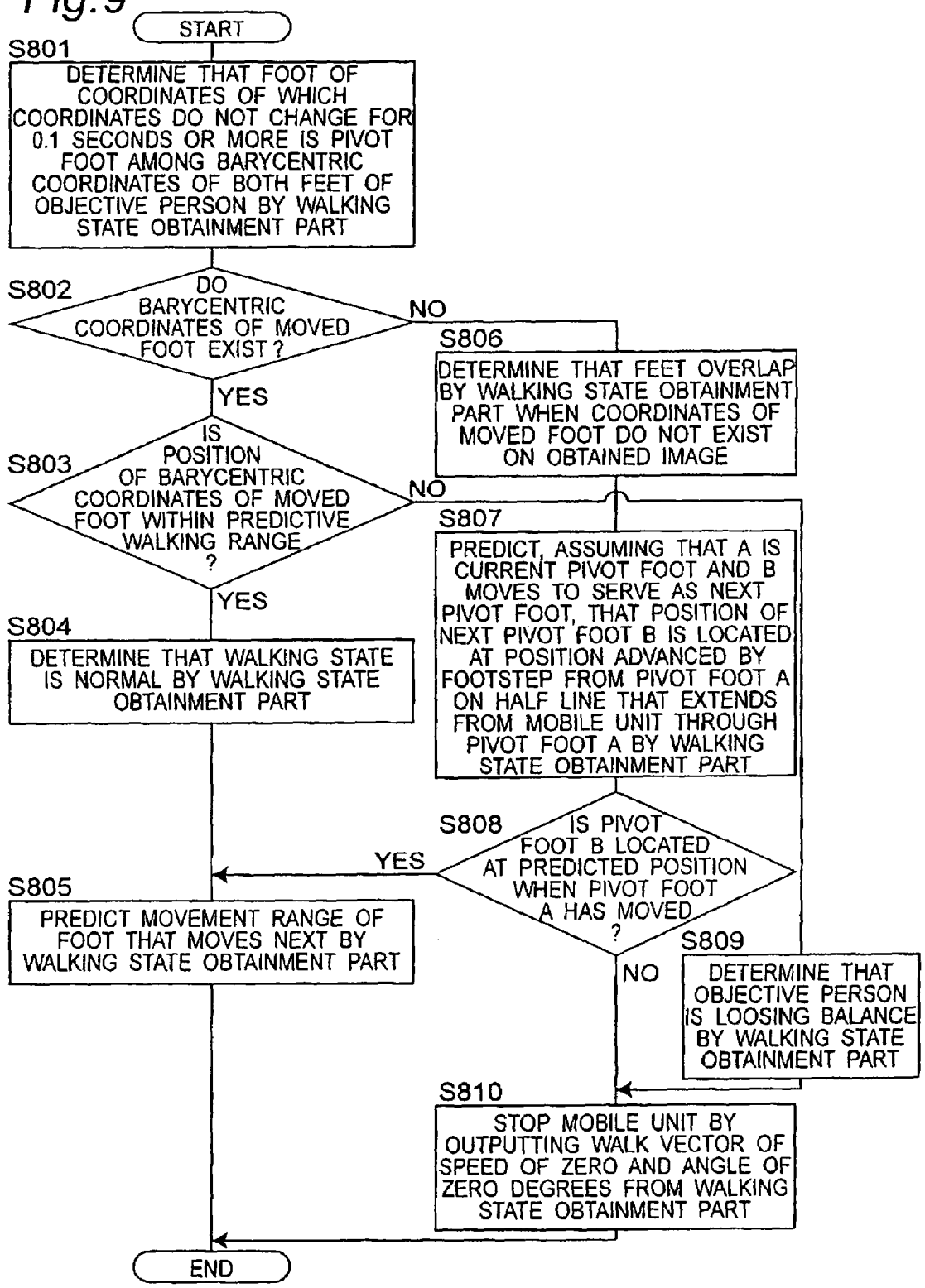
FIG. 9 is a flow chart showing a walk prediction method after the start of walking of the objective person by the walk tracking method by means of the walk tracking apparatus of the above embodiment.
Figure 27:
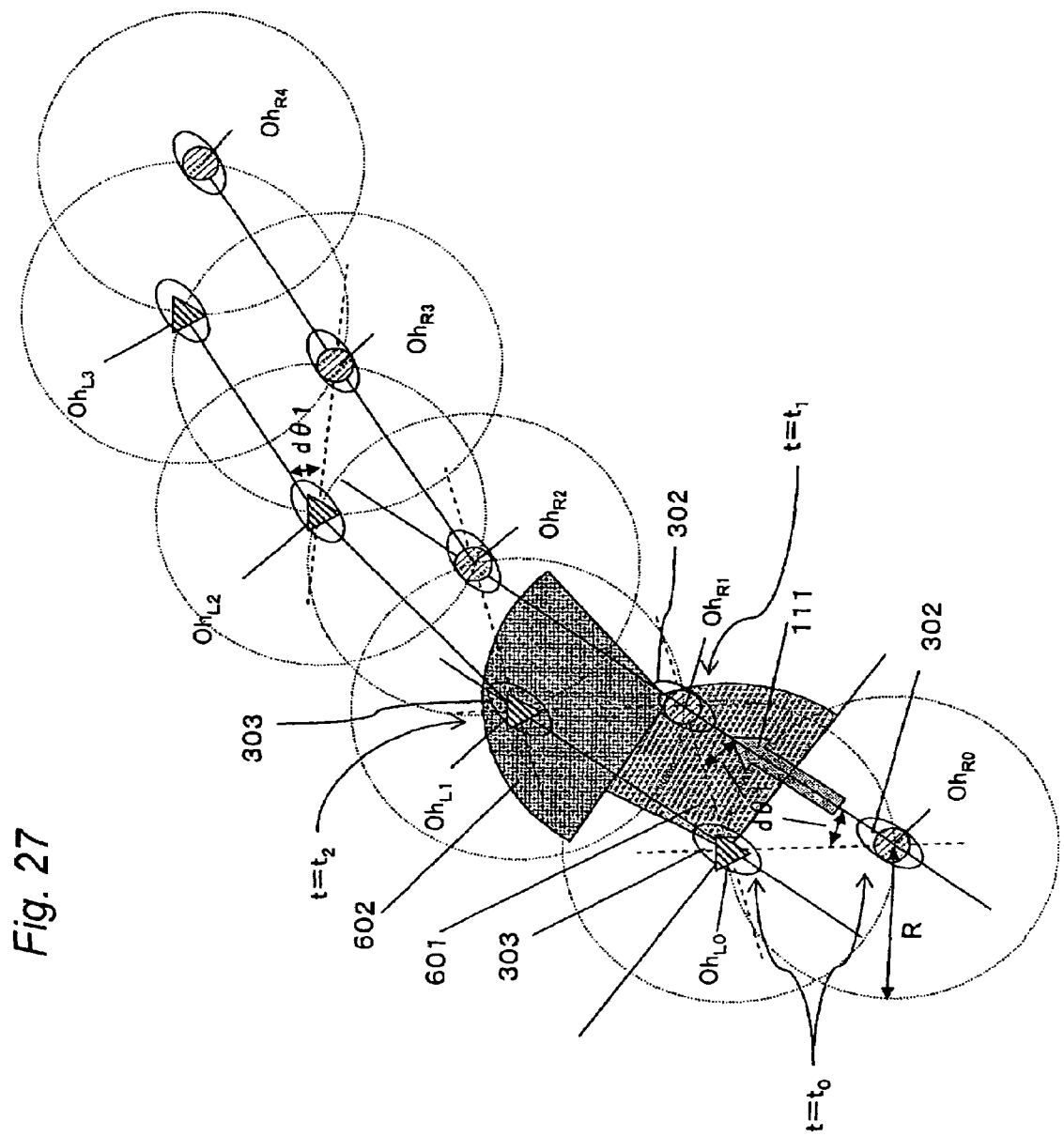
FIG. 27 is an explanatory view for explaining another concrete example of the automatic walk tracking method by means of the mobile unit equipped with the walk tracking apparatus of the above embodiment.
Figure 28:
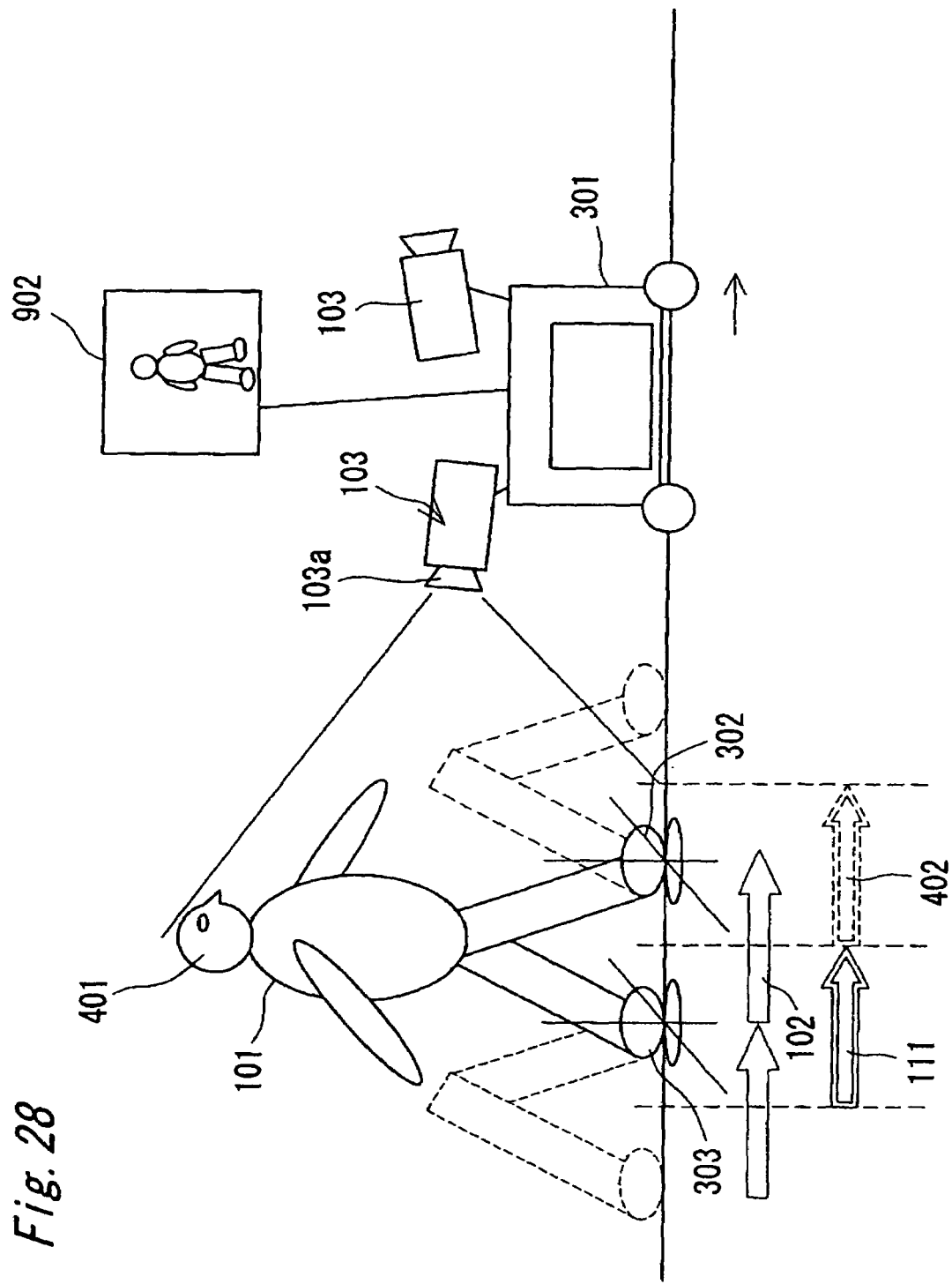
FIG. 28 is an explanatory view showing an exemplified method for determining the walking speed and the walking direction of the objective person by the automatic walk tracking method by means of the mobile unit equipped with a walk tracking apparatus according to another embodiment of the present invention.
Figure 29:
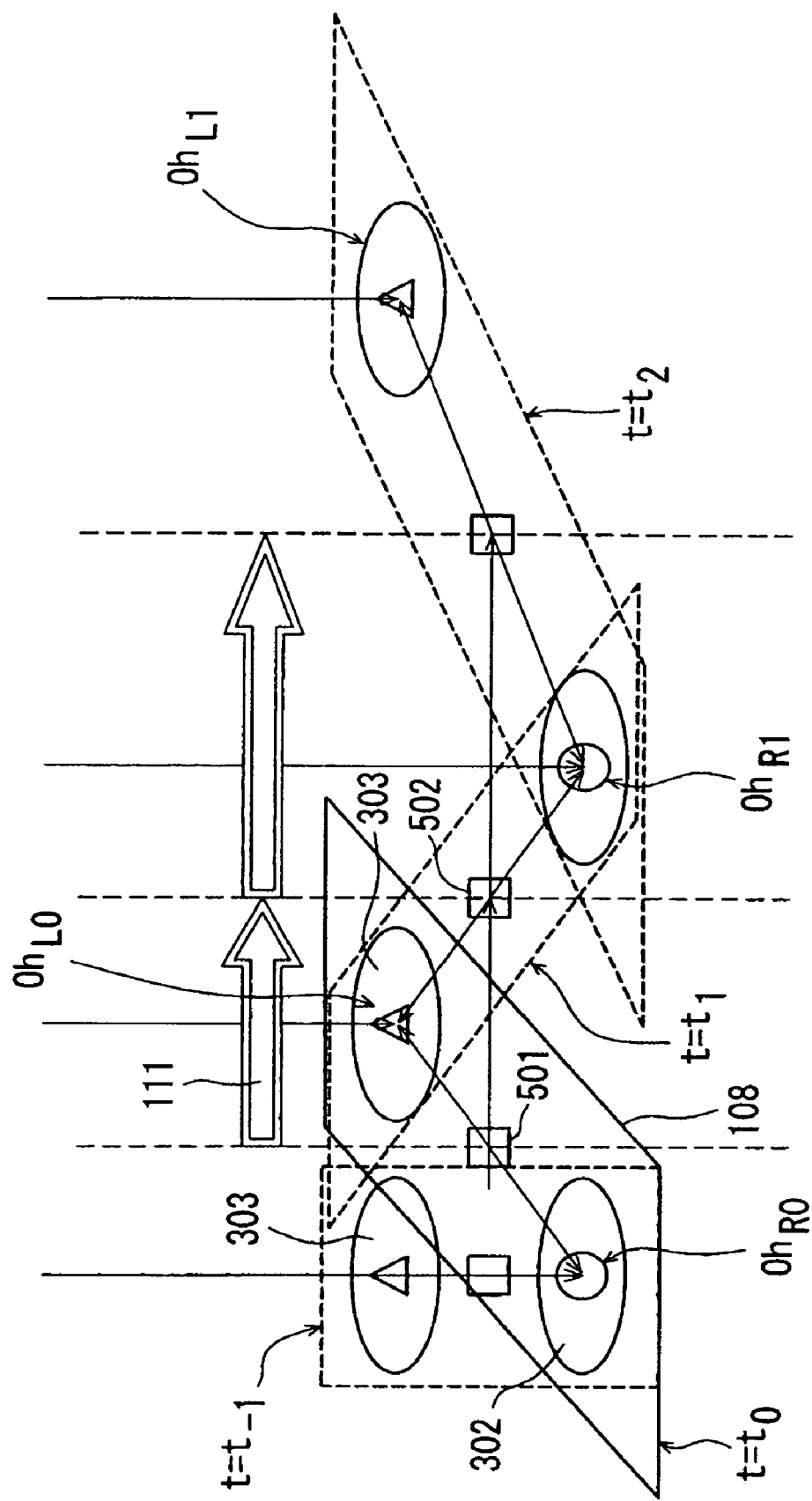
FIG. 29 is an explanatory view showing an example of the walking state of the objective person by the automatic walk tracking method by means of the mobile unit equipped with the walk tracking apparatus of the above another embodiment of FIG. 28.
Figure 30:
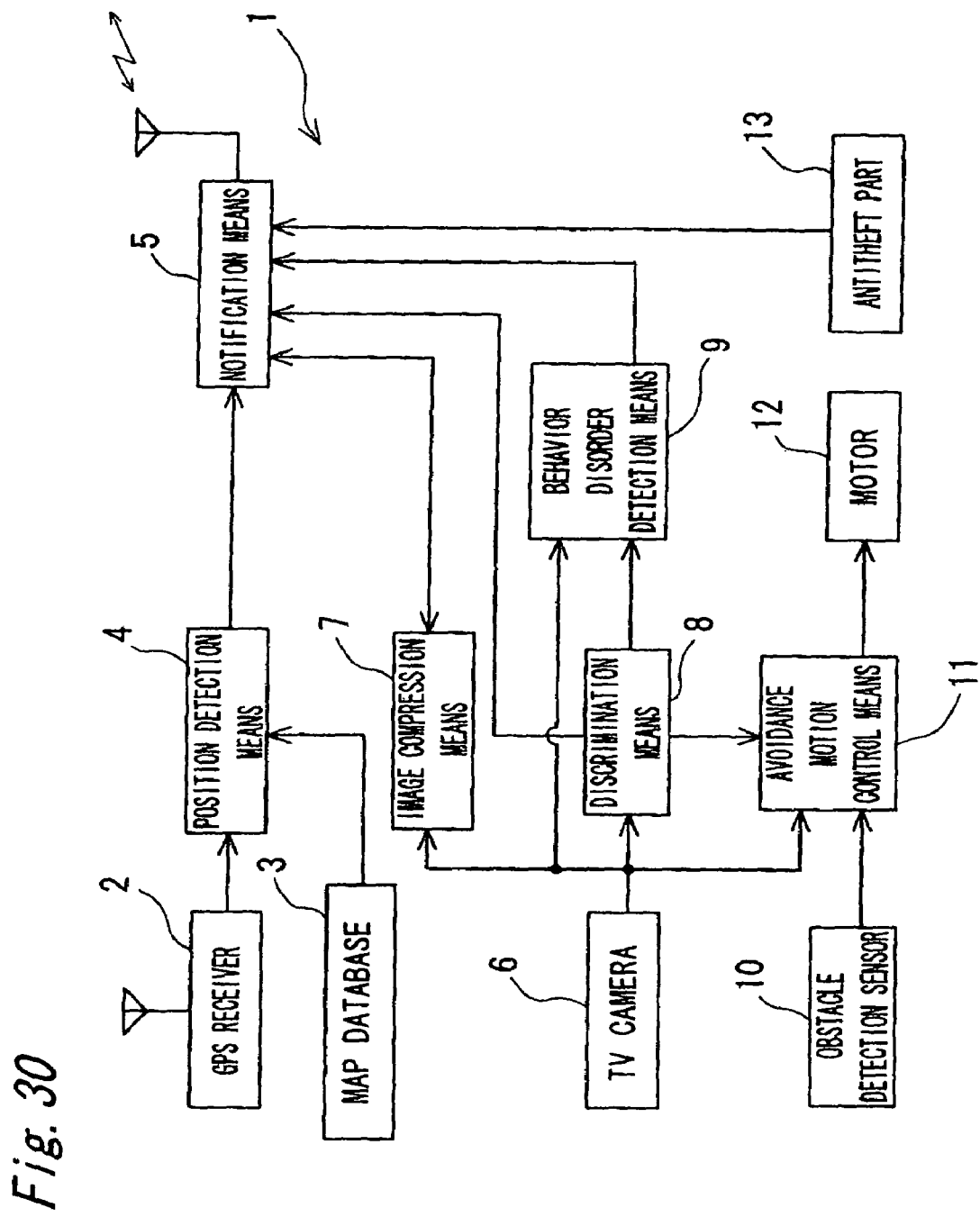
FIG. 30 is a block diagram for explaining a conventional mobile unit tracking method.

FIG. 1A is a block diagram showing the schematic construction of the walk tracking apparatus and the mobile unit equipped with the walk tracking apparatus of the above embodiment of the present invention. FIG. 1B shows the coordinate system used in the present invention with illustrations of an objective person 101 to be tracked, an arrow 102 indicating the walking state (for example, landing of a foot of the objective person) of the objective person 101, and the mobile unit 301. FIG. 2 is a flow chart of the processing steps of the objective person walk tracking method by means of the mobile unit equipped with the walk tracking apparatus of the above embodiment of the present invention. FIGS. 3 through 7 are flow charts of the details of the respective steps of FIG. 2. FIGS. 8 and 9 are flow charts of the start of walking and the prediction of walking. FIGS. 3 and 10 through 27 are explanatory views for explaining a concrete example of the automatic walk tracking of the present embodiment. FIGS. 28 and 29 are explanatory views of a method for determining the walking speed and the walking direction of the objective person in another embodiment.

First of all, the construction of the tracking device that tracks the objective person (ambulatory elder or the like) of one example of the walk tracking type mobile unit is described with reference to FIG. 1A.

The reference numeral 103 denotes an objective person measurement device for measuring information for specifying or recognizing the objective person 101, information of the walking state, and so on, by being constructed of an image capturing device 103a such as a camera for detecting the walking state 102 when $t=t_0$ (e.g., at the present time) and an image processing part 103b for processing the captured image or being constructed of a sensor part that serves as a signal receiver, which receives signals from signal transmitters that transmit information of the right foot and the left foot attached to both feet of the objective person 101.

The reference numeral 105 denotes a walking state obtainment part (which can serve as one example of a foot landing obtainment part) for obtaining objective person data 106 when $t=t_0$ (e.g., a static image of the objective person 101 obtained by the camera 103a when $t=t_0$ or signals obtained by the signal receivers) inputted from the objective person measurement device 103 and calculating walking state data 108 when $t=t_0$ (e.g., barycentric coordinates of the feet below the heels of the objective person 101 detected by a matching process or the like from the data of the image of the objective person data 106 or position data obtained by the processing of the trigonometrical survey or the like from the signals obtained by the signal receivers). It is noted that the walking state data 108 may include the features of walking such as the footstep and walking cycle of the objective person 101.

The reference numeral 107 denotes a walking state storage part for storing the walking state data 108 when $t=t_0$ and when $t=t_{-1}$ (e.g., in the past) before $t=t_0$ calculated in the walking state obtainment part 105.

The reference numeral 109 denotes a walking state determination part for obtaining the walking state data 108 when $t=t_0$ calculated in the walking state obtainment part 105 and the walking state data 110 when $t=t_{-1}$ before the time $t=t_0$ stored in the walking state storage part 107. The walking state determination part 109 calculates a walk vector (speed and angle) (mobile unit movement vector) 111 of the objective person 101 when $t=t_0$ on the basis of the walking state data 108 when $t=t_0$ and the walking state data 110 when $t=t_{-1}$ ($t_o > t_{-1}$).

The reference numeral 112 denotes an objective person storage part for storing at least one of the objective person data 106 when $t=t_0$ from the objective person measurement device 103 and foot data 113 of the objective person 101 when $t=t_0$ (e.g., static image of the heels of the objective person 101 detected by a matching process or the like from the objective person data 106, or the signals obtained by the signal receivers) calculated in the walking state obtainment part 105.

The reference numeral 114 denotes an objective person discrimination part for obtaining at least one of the objective person data 106 when $t=t_0$ from the objective person measurement device 103 and the foot data 113 of the objective person 101 when $t=t_0$ calculated in the walking state obtainment part 105 as well as the objective person storage data 115 when $t=t_{-1}$ stored in the objective person storage part 112, and calculating objective person confirmation data 116 when $t=t_0$ (e.g., corrigenda data of the objective person data 106 or the foot data 113 determined by the matching process or the like from the objective person data 106 or the foot data 113) from the objective person storage data 115. It is noted that the objective person discrimination part 114 also has a function to execute the processing of the confirmation, determination and so on of the information for recognizing or specifying the objective person 104 in an objective person specifying process described later.

The reference numeral 117 denotes a movement commanding part for calculating a movement command 118 by the walk vector 111 when $t=t_0$ from the walking state determination part 109 and the objective person confirmation data 116 when $t=t_0$ from the objective person discrimination part 114.

The reference numeral 901 denotes an input device of a key, a mouse, a voice input, or the like for inputting information of the objective person specifying information, walking state information, and so on.

The reference numeral 902 denotes a display device such as an LCD device, for functioning as one example of the output device and displaying the objective person specific information, walking state information, and so on.

The objective person measurement device 103, camera 103a, image processing part 103b, walking state obtainment part 105, walking state determination part 109, walking state storage part 107, movement commanding part 117, objective person storage part 112, objective person discrimination part 114, input device 901, and display device 902 constitute a tracking unit 1000 for operating as described below.

The reference numeral 119 denotes a driving part of the walk tracking type mobile unit 301 equipped with the tracking unit 1000, for operating as follows by executing movement command 118 obtained from the movement commanding part 117 of the tracking unit 1000 or, for example, driving the walk tracking type mobile unit 301 for tracking as described later. In concrete, the mobile unit 301 has a pair of running wheels 119a, a pair of driving devices 119b such as motors for forwardly and reversely driving the pair of running wheels 119a, and a pair of drivers 119c for controlling the driving of the pair of driving devices 119b on the basis of the movement command 118. It is noted that the running wheels 119a are not limited to one pair but allowed to be arbitrary in number such as three or four, and it is proper to appropriately provide the driving devices 119b and the drivers 119c according to the number.

It is noted that the walking state detection means is constructed of the objective person discrimination part 114 for determining the objective person 101, both feet position detection means (objective person measurement device 103 etc., as one example thereof) for detecting the positions of both feet 302 and 303 of the objective person 101, and so on. The walking speed/route detection means is constructed of the walking state determination part 109 etc. as one example. The control means is constructed of the walking state obtainment part 105 and the movement commanding part 117 etc. as one example.

Figure 10:
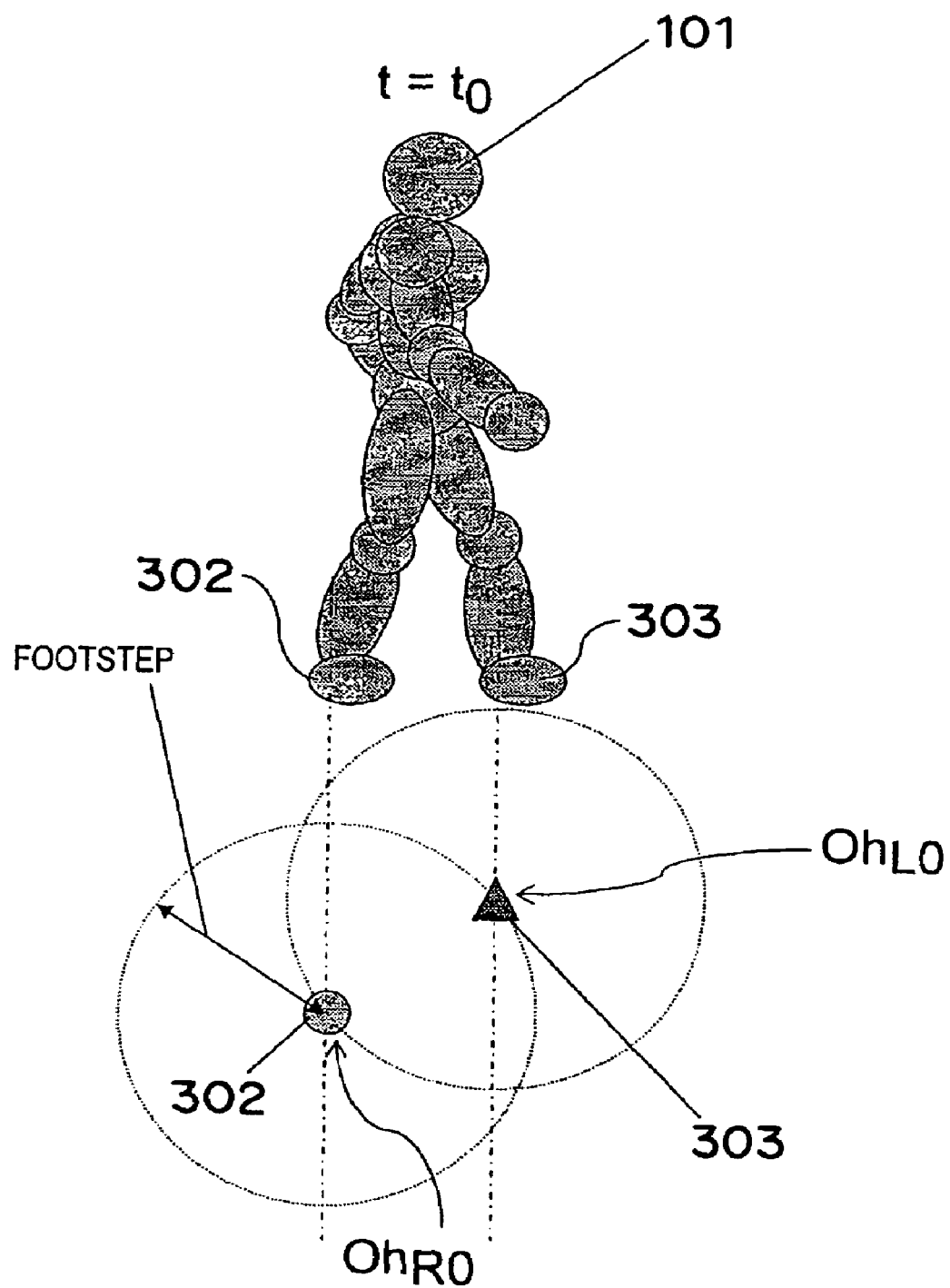
FIG. 10 is an explanatory view showing the objective person in a walking start state when $t=t_0$ (state in which the left foot of the objective person is located one step ahead of the right foot) in correspondence with the two-dimensional coordinates of both feet at the time by the walk tracking method by means of the walk tracking apparatus of the above embodiment.

Next, it is assumed that the coordinates of the objective person 101 and the mobile unit 301 are indicated by the coordinate system shown in FIG. 1B with the mobile unit 301 served as a reference. It is herein assumed that the objective person 101 and the mobile unit 301 move on an XY plane, position coordinates Or(0,0) are located at the position of the mobile unit 301, position coordinates $Oh_{R0}(X_{R0}, Y_{R0})$ are the coordinates of the right foot 302 of the objective person 101 when $t=t_0$, and position coordinates $Oh_{L0}(X_{L0}, Y_{L0})$ are the coordinates of the left foot 303 of the objective person 101 when $t=t_0$0. In the following description, with regard to the objective person 101, it is further assumed that the left foot 303 of the objective person 101 is located one step ahead of the right foot 302 when $t=t_0$ as shown in FIG. 10 and so on. Therefore, it is assumed that, when the right foot 302 of the objective person 101 normally takes one step forward with the position coordinates $Oh_{L0}(X_{L0}, Y_{L0})$ of the left foot 303 of the objective person 101 kept intact when $t=t_1$ after the time $t_0$0, the right foot 302 after stepping forward has the position coordinates of $Oh_{R1}(X_{R1}, Y_{R1})$ It is further assumed that, when the left foot 303 of the objective person 101 normally takes one step forward with the position coordinates $Oh_{R1}(X_{R1}, Y_{R1})$ of the right foot 302 of the objective person 101 kept intact when $t=t_2$ after the time $t_1$, the left foot 303 after stepping forward has the position coordinates of $Oh_{L1}(X_{L1}, Y_{L1})$.

Further, with regard to the operation steps of the tracking method of the present embodiment, its outline is first described, and thereafter the detail of each operation step is described with reference to the flow chart of FIG. 2. The operation steps are carried out principally in the order of an objective person specifying process in step S100, an objective person walking state data obtainment process in step S200, an objective person confirmation process in step S300, an objective person walking speed and angle calculation process in step S400, and an objective person tracking process in step S500.

Objective Person Specifying Process: Step S100

The objective person 101 in FIG. 1A is recognized and specified by the tracking unit 1000 that is mounted on the mobile unit 301 and has the construction shown in FIG. 1A, and the specified objective person data 106 is stored in the objective person storage part 112 and inputted to the walking state obtainment part 105 and the objective person discrimination part 114. It is herein acceptable to preparatorily input the images of the features of the shoes and so on of the objective person 101 to the tracking unit 1000 by means of the camera 103a or the like as a method for recognizing the objective person 101.

Objective Person Walking State Data Obtainment Process: Step S200

Information of the walking state 102 of the objective person 101 is measured by the objective person measurement device 103 and inputted as a part of the objective person data 106 to the walking state obtainment part 105. The walking state data 108 is calculated in the walking state obtainment part 105 and stored in the objective person storage part 112 and inputted to the walking state determination part 109. Likewise, the walking state data 108 of the objective person 101 is also inputted as a part of the objective person data 106 to the walking state storage part 107.

Objective Person Confirmation Process: Step S300

At least one of the objective person data 106 when $t=t_0$ and the foot data 113 of the objective person 101 when $t=t_0$ calculated in the walking state obtainment part 105 is stored by the objective person discrimination part 114. The stored data is compared with the objective person storage data 115 when $t=t_{-1}$ stored in the objective person storage part 112, and the objective person confirmation data 116 when $t=t_0$ is outputted. It is determined whether or not the objective person 101, who is being currently recognized, is exactly the previously measured objective person 101 according to the outputted objective person confirmation data 116. It is assumed that the objective person storage data 115 is surely be the data of the same kind as that of either one or both the objective person data 106 when $t=t_0$ and the foot data 113 of the objective person when $t=t_0$ to be compared in the objective person discrimination part 114.

Objective Person Walking Speed And Angle Calculation Process: Step S400

The walking state data 108 when $t=t_0$ is compared with the walking state data 110 when $t=t_{-1}$ stored in the walking state storage part 107 by the walking state determination part 109 to obtain the walk vector 111 (speed and angle). In this case, the footstep included in the walking state data 108 may be preparatorily stored in the form of the footstep of the objective person 101 or the mean value of the footsteps of ordinary persons into the tracking unit 1000. It is otherwise acceptable to calculate the footstep from information of the height of the objective person 101 in recognizing the objective person 101 (step S100). It is acceptable to calculate the information of the height of the objective person 101 from the image information or directly teach the information to the tracking unit 1000.

Objective Person Tracking Process: Step S500

By the objective person confirmation data 116 and the walk vector 111 when $t=to$, the movement command 118 is transferred from the movement commanding part 117 of the tracking unit 1000 to the driving part 119 of the mobile unit 301, and the movement of the mobile unit 301 is controlled so that the mobile unit 301 tracks the objective person 101 while keeping a prescribed distance (minimum distance) to the objective person 101 as described later. The position, which becomes the movement target of the mobile unit 301, is assumed to have position coordinates at, for example, a midpoint between the position coordinates of the right foot 302 and the position coordinates of the left foot 303 of the objective person 101.

The aforementioned steps S100 through S500 are described in detail below.

Figure 3:
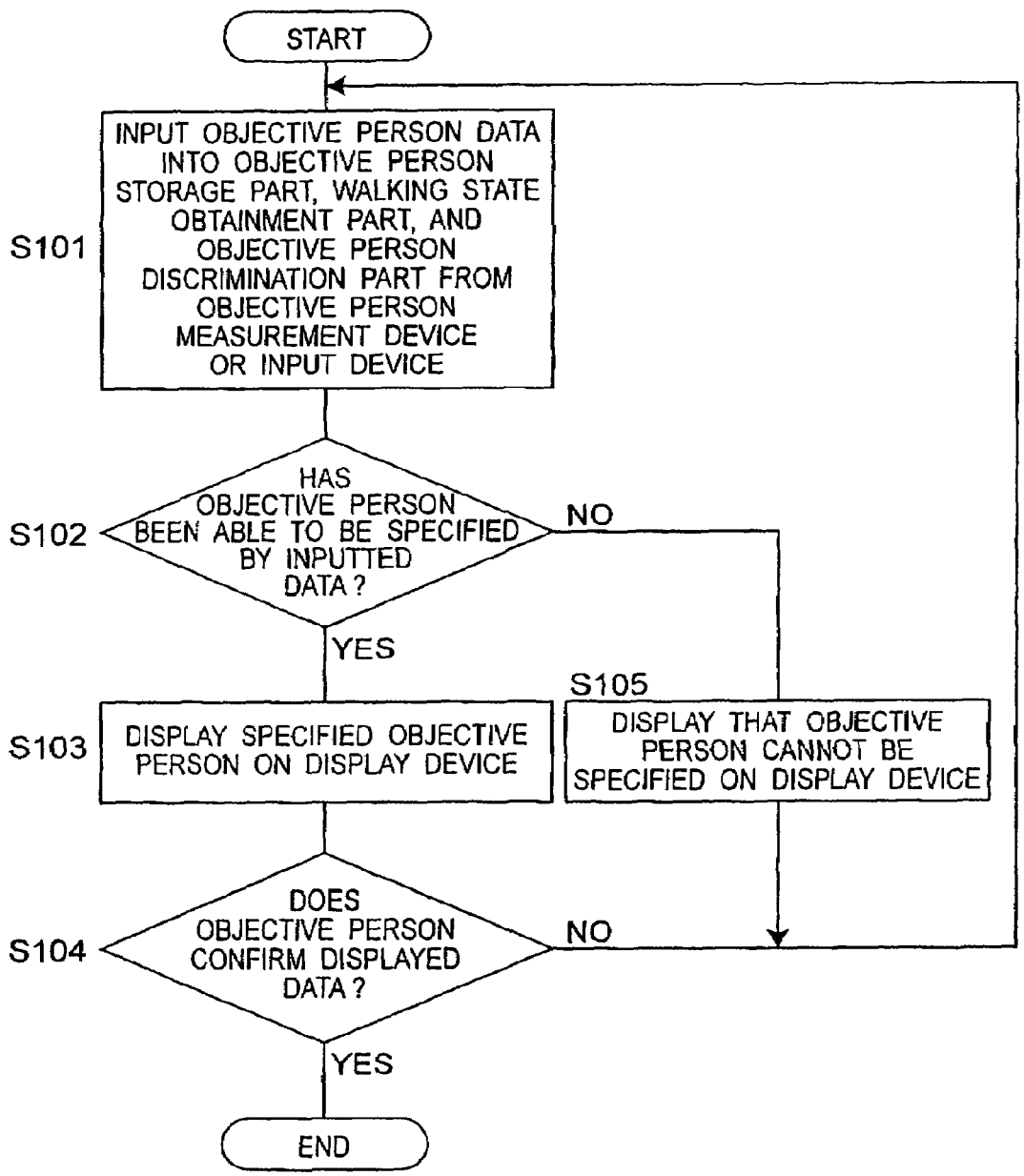
FIG. 3 is a flow chart showing a process for specifying the objective person by the walk tracking method by means of the walk tracking apparatus of the above embodiment.
Figure 4:
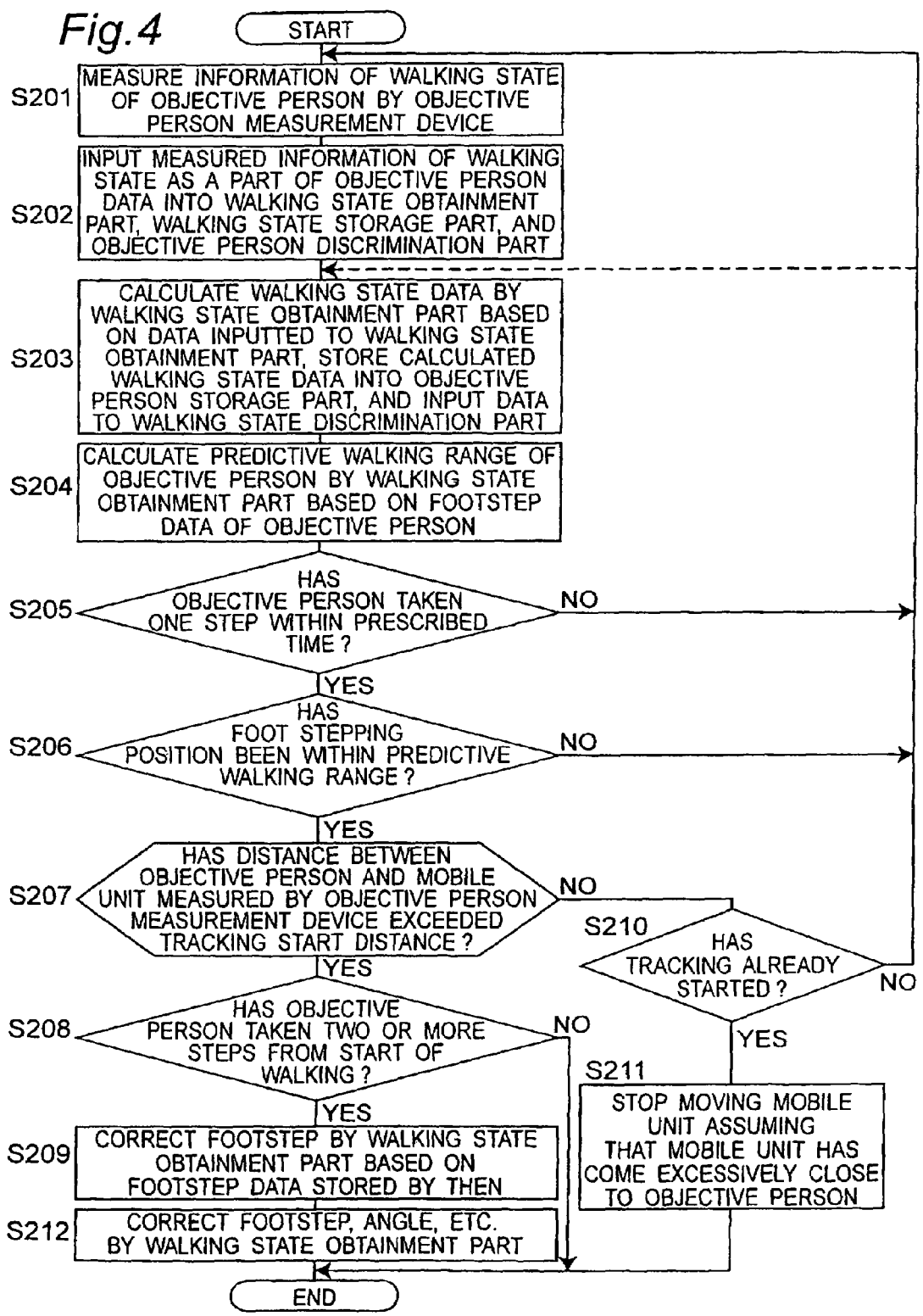
FIG. 4 is a flow chart showing a walking state data obtainment process of the objective person by the walk tracking method by means of the walk tracking apparatus of the above embodiment.
Figure 5:
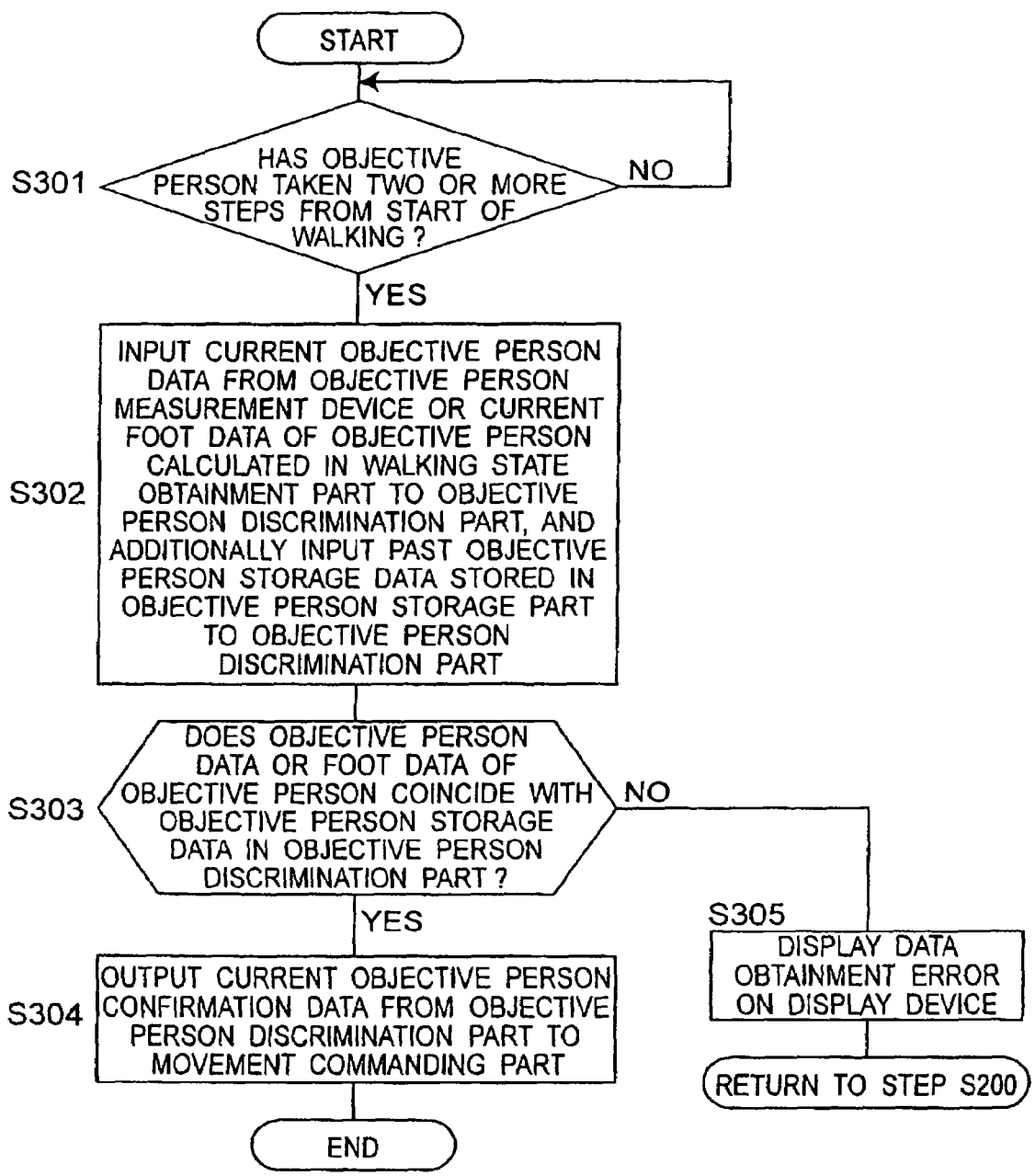
FIG. 5 is a flow chart showing an objective person confirmation process by the walk tracking method by means of the walk tracking apparatus of the above embodiment.

FIG. 3 shows a flow chart of the objective person specifying process in step S100. FIG. 4 shows a flow chart of the objective person walking state data obtainment process in step S200. FIG. 5 shows a flow chart of the objective person confirmation process in step S300. FIG. 6 shows a flow chart of the objective person walking speed and angle calculation process in step S400. FIG. 7 shows a flow chart of the objective person tracking process in step S500.

Moreover, the walk of the objective person 101 in the normal state is assumed as follows in the following processes. That is, it is assumed that the state in which the left foot 303 of the objective person 101 is located one step ahead of the right foot 302 is a walking start state, the walking starts from the state and a time before the start of walking is the time $t=t_0$. Then, the objective person 101 puts the right foot 302 one step forward centering on the left foot 303 and lands when $t=t_1$. At this time, the right foot 302 is lifted when $t=t_0'$ from the position of the right foot 302 when $t=t_0$, the right foot 302 is put forward when $t=t_0''$ and the right foot 302 lands when $t=t_1$.

Next, the objective person 101 puts the left foot 303 one step forward centering on the right foot 302 and lands when $t=t_2$.

Figure 13:
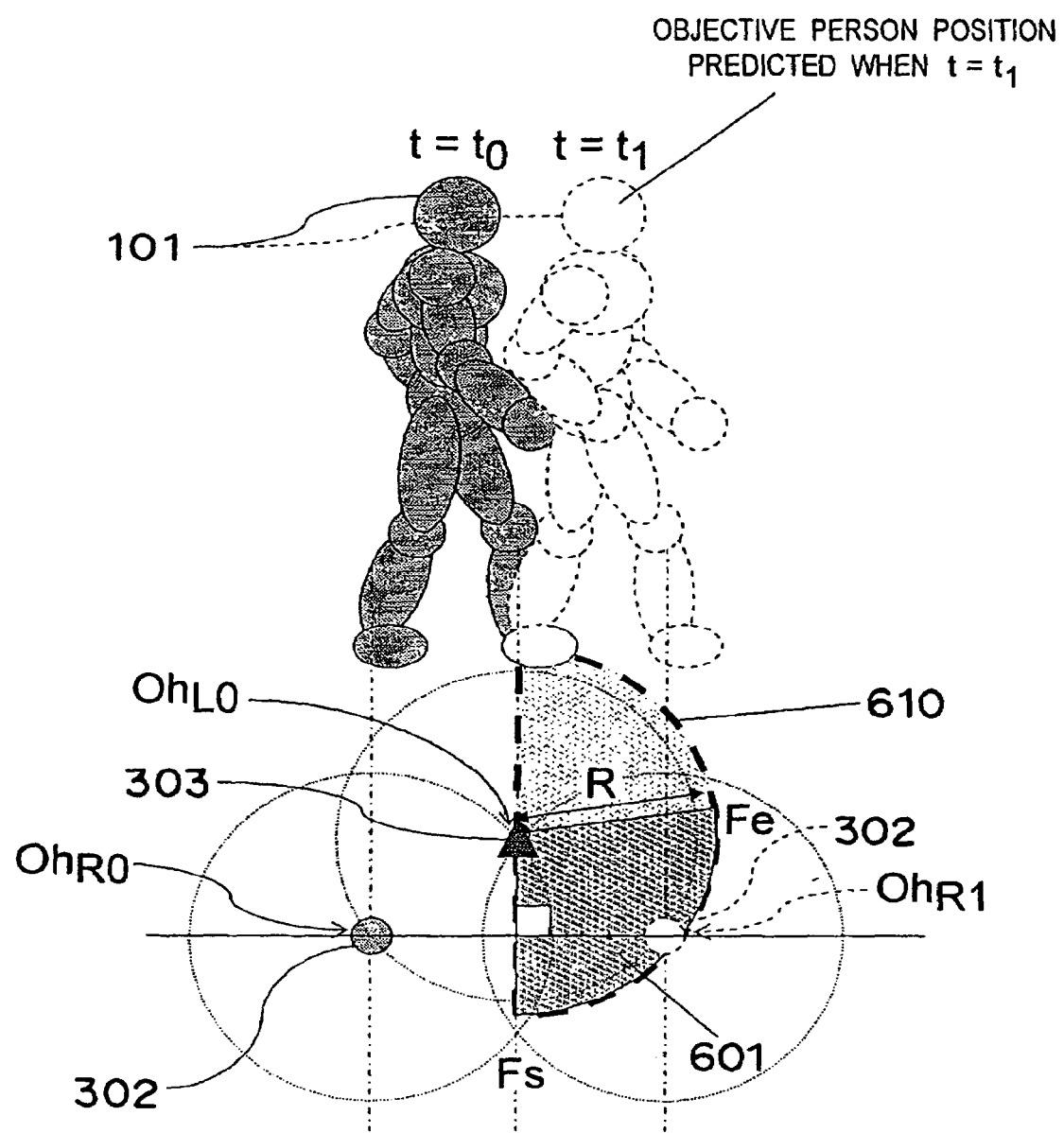
FIG. 13 is an explanatory view showing a state where a predictive walking range in a normal walking state when $t=t_1$ is superimposed on FIG. 10 when $t=t_0$ by the walk tracking method by means of the walk tracking apparatus of the above embodiment.
Figure 17:
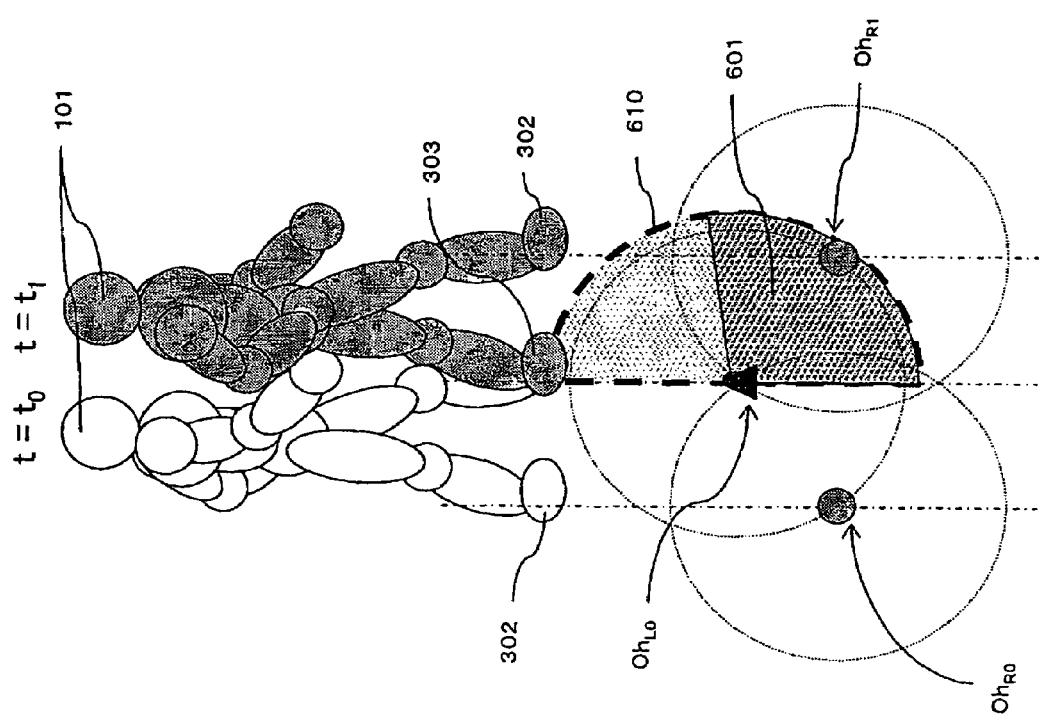
FIG. 17 is an explanatory view showing the objective person in the normal walking state when $t=t_1$ (state in which the right foot of the objective person is located one step ahead of the left foot) in correspondence with the two-dimensional coordinates of both feet at the time by the walk tracking method by means of the walk tracking apparatus of the above embodiment.
Figure 20:
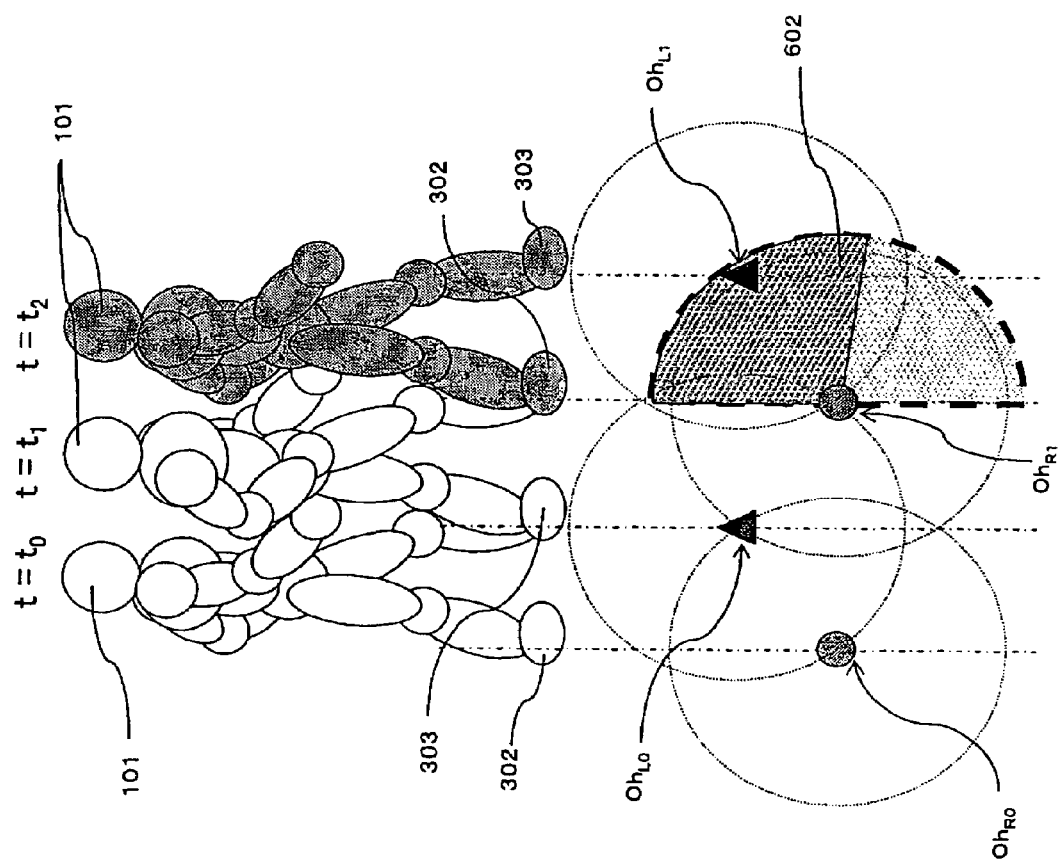
FIG. 20 is an explanatory view showing the objective person in the normal walking state when $t=t_2$ (state in which the left foot of the objective person is located one step ahead of the right foot) in correspondence with the two-dimensional coordinates of both feet at the time by the walk tracking method by means of the walk tracking apparatus of the above embodiment.

FIG. 10 is an explanatory view showing the objective person 101 in the walking start state when $t=t_0$ (state in which the left foot 303 of the objective person 101 is located one step ahead of the right foot 302) in correspondence with the two-dimensional coordinates of both feet 302 and 303 thereof at the time. It is noted that in the figure, the triangular mark indicates the position in which the left foot 303 has landed, and the circular mark indicates the position in which the right foot 302 has landed. The same thing can be said for the other figures. FIG. 13 is an explanatory view showing the predictive walking range in the normal walking state when $t=t_1$ superimposed on FIG. 10 when $t=t_0$. FIG. 17 is an explanatory view showing the objective person 101 in the normal walking state when $t=t_1$ (state in which the right foot 302 of the objective person 101 is located one step ahead of the left foot 303) in correspondence with the two-dimensional coordinates of both feet 302 and 303 at the time. FIG. 20 is an explanatory view showing the objective person 101 in the normal walking state when $t=t_2$ (state in which the left foot 303 of the objective person 101 is located one step ahead of the right foot 302) in correspondence with the two-dimensional coordinates of both feet 302 and 303 at the time.

Figure 11:
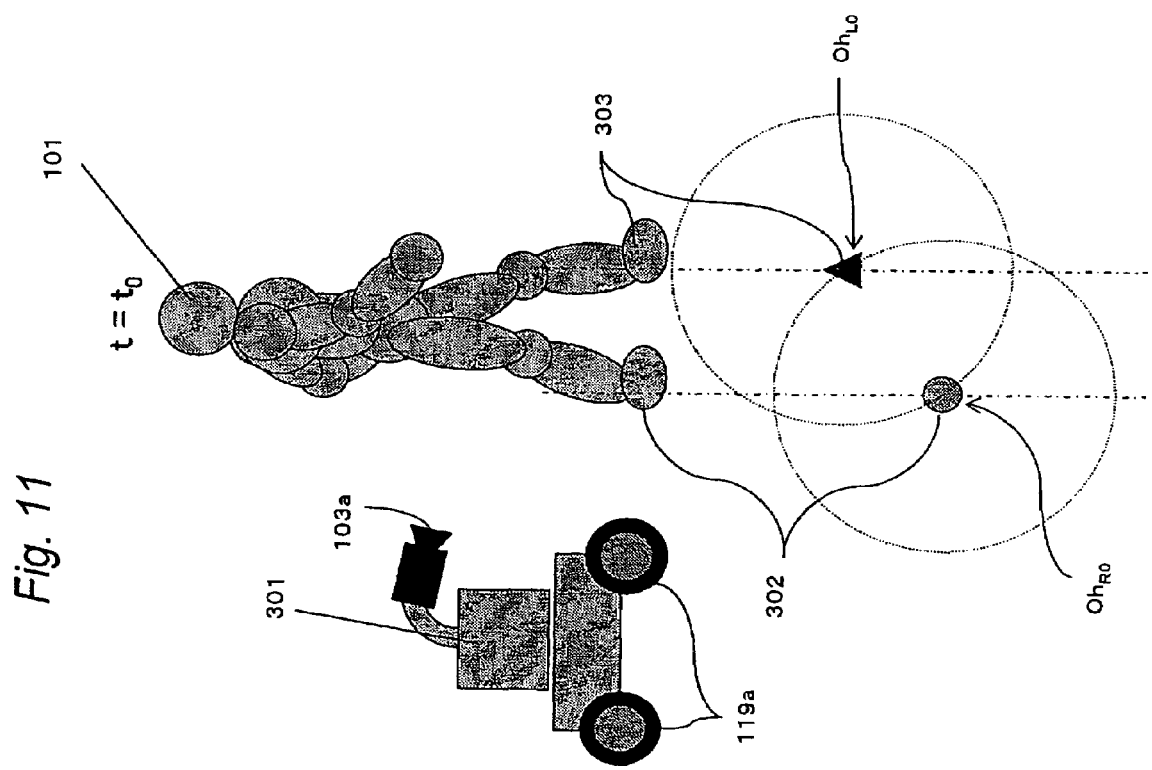
FIG. 11 is an explanatory view showing one example in which the mobile unit is going to track the objective person in the walking start state when $t=t_0$ (state of FIG. 10) by the walk tracking method by means of the walk tracking apparatus of the above embodiment.
Figure 19:
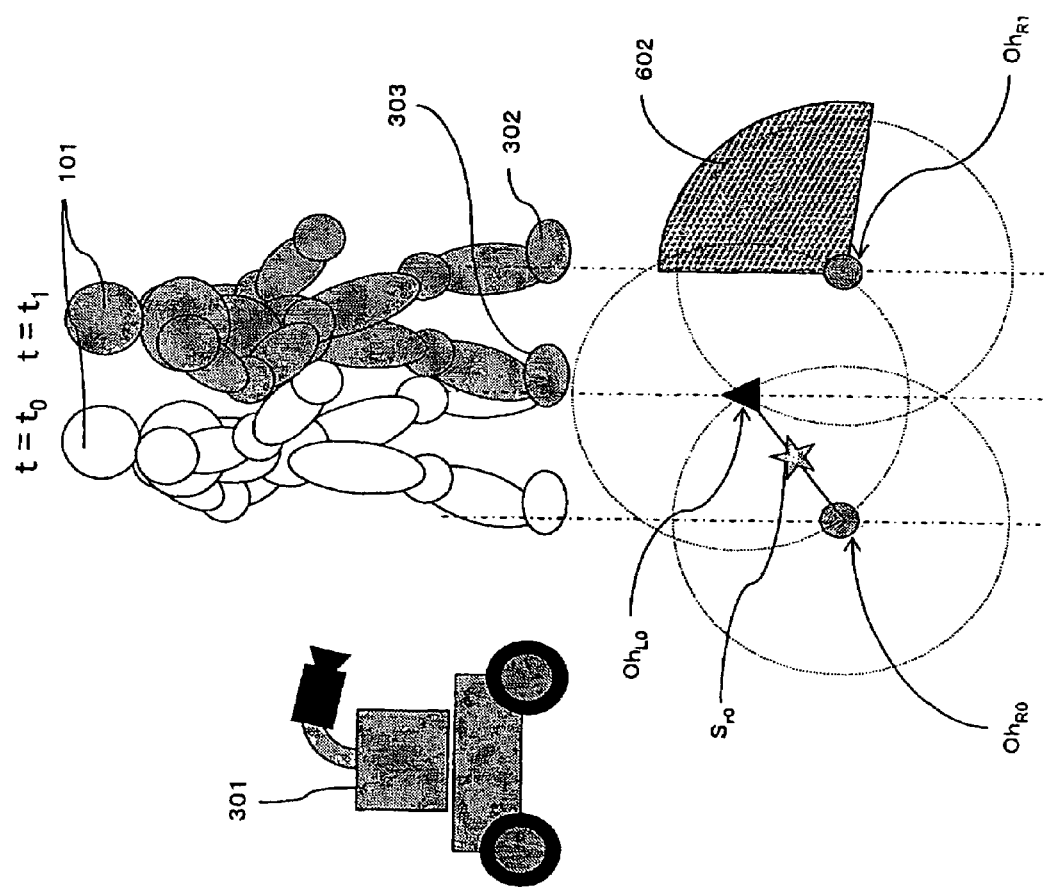
FIG. 19 is an explanatory view showing one example in which the mobile unit is going to track the objective person in the normal walking state when $t=t_1$ (state of FIG. 17) by the walk tracking method by means of the walk tracking apparatus of the above embodiment.
Figure 21:
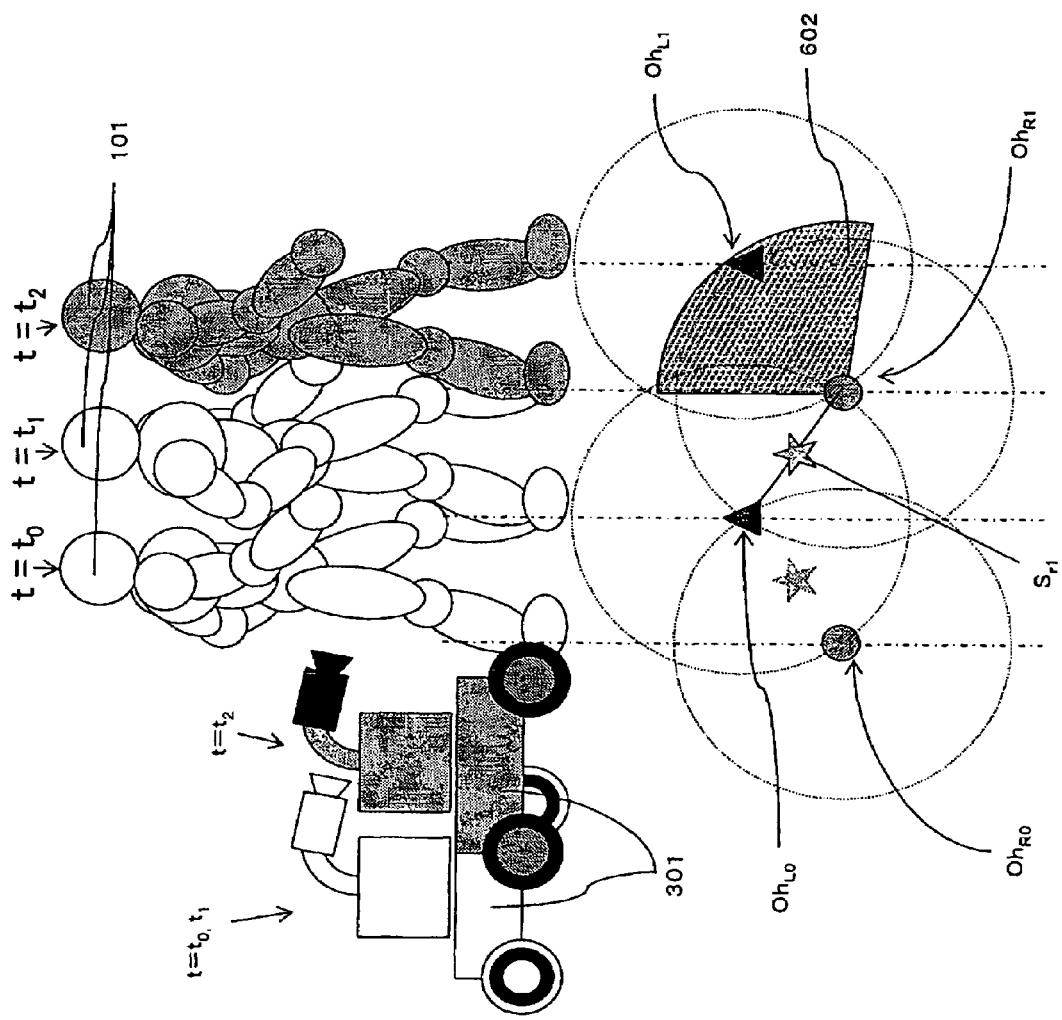
FIG. 21 is an explanatory view showing one example in which the mobile unit starts tracking the objective person in the normal walking state when $t=t_2$ (state of FIG. 20) by the walk tracking method by means of the walk tracking apparatus of the above embodiment.

Further, FIG. 11 is an explanatory view showing one example in which the mobile unit 301 is going to track the objective person 101 in the walking start state when $t=t_0$ (state of FIG. 10) (the mobile unit 301 is still in a movement stop state). FIG. 19 is an explanatory view showing one example in which the mobile unit 301 is going to track the objective person 101 in the normal walking state when $t=t_1$ (state of FIG. 17) (the mobile unit 301 is still in the movement stop state). FIG. 21 is an explanatory view showing one example in which the mobile unit 301 is moving starting tracking the objective person 101 in the normal walking state when $t=t_2$ (state of FIG. 20).

Figure 12:
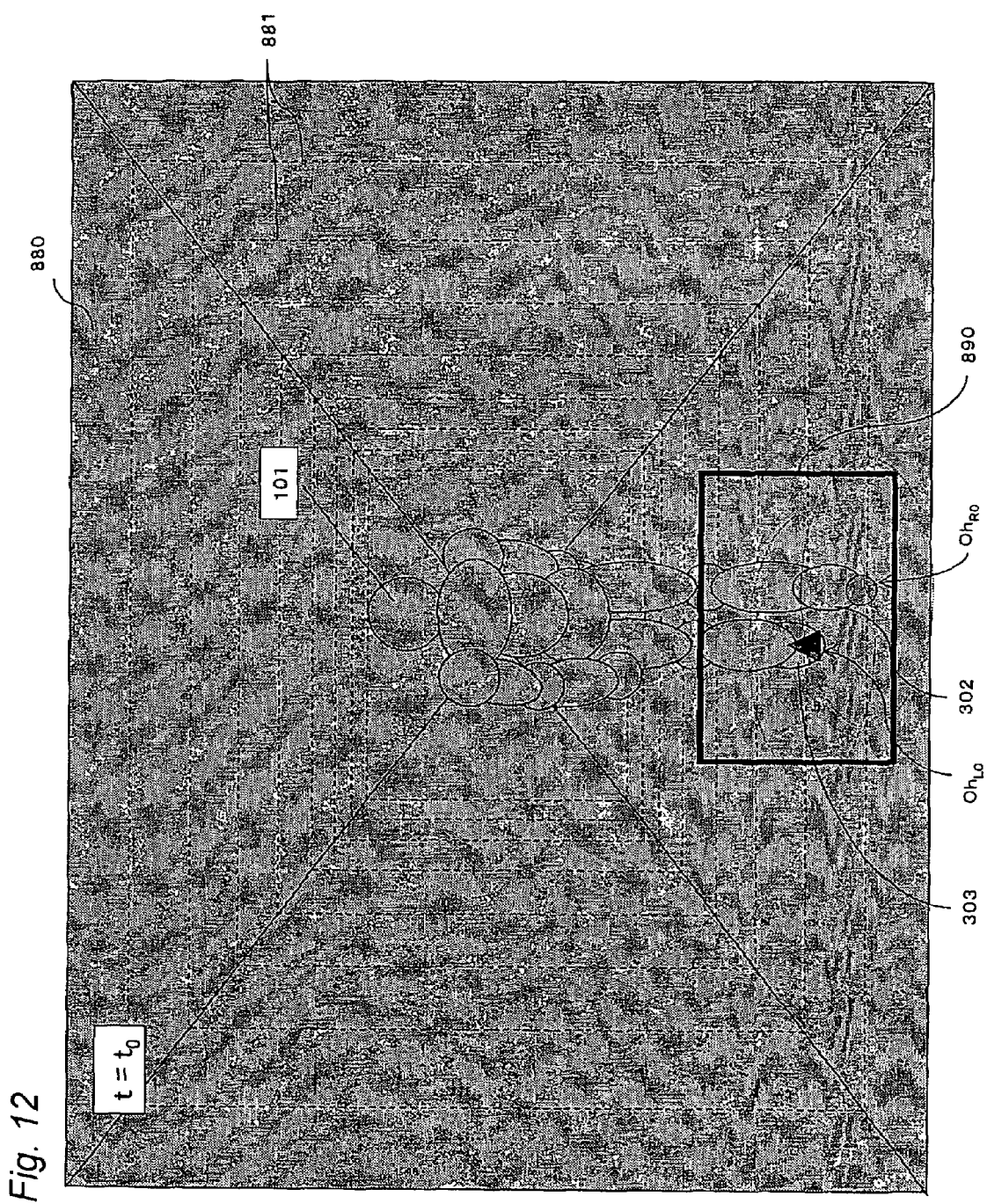
FIG. 12 is a view showing an image obtained by a camera in the walking start state when $t=t_0$ (state of FIG. 10, i.e., state in which both feet are landed) and an image region, to which attention is paid, in the image by the walk tracking method by means of the walk tracking apparatus of the above embodiment.
Figure 14:
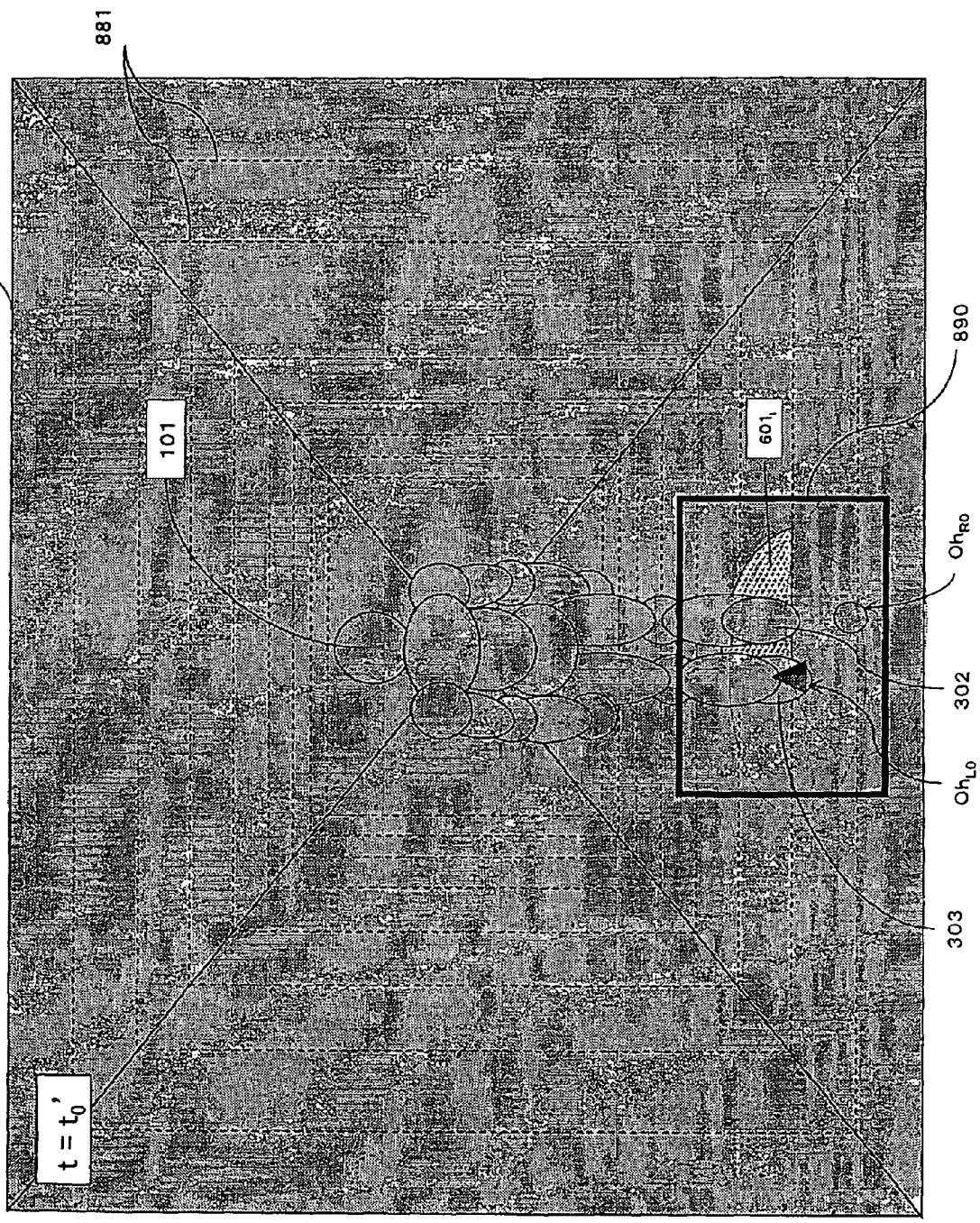
FIG. 14 is a view showing a state where the predictive walking range in the normal walking state when $t=t_1$ is superimposed on FIG. 12 when $t=t_0'$ (state in which the right foot is lifted apart from the ground) by the walk tracking method by means of the walk tracking apparatus of the above embodiment.
Figure 15:
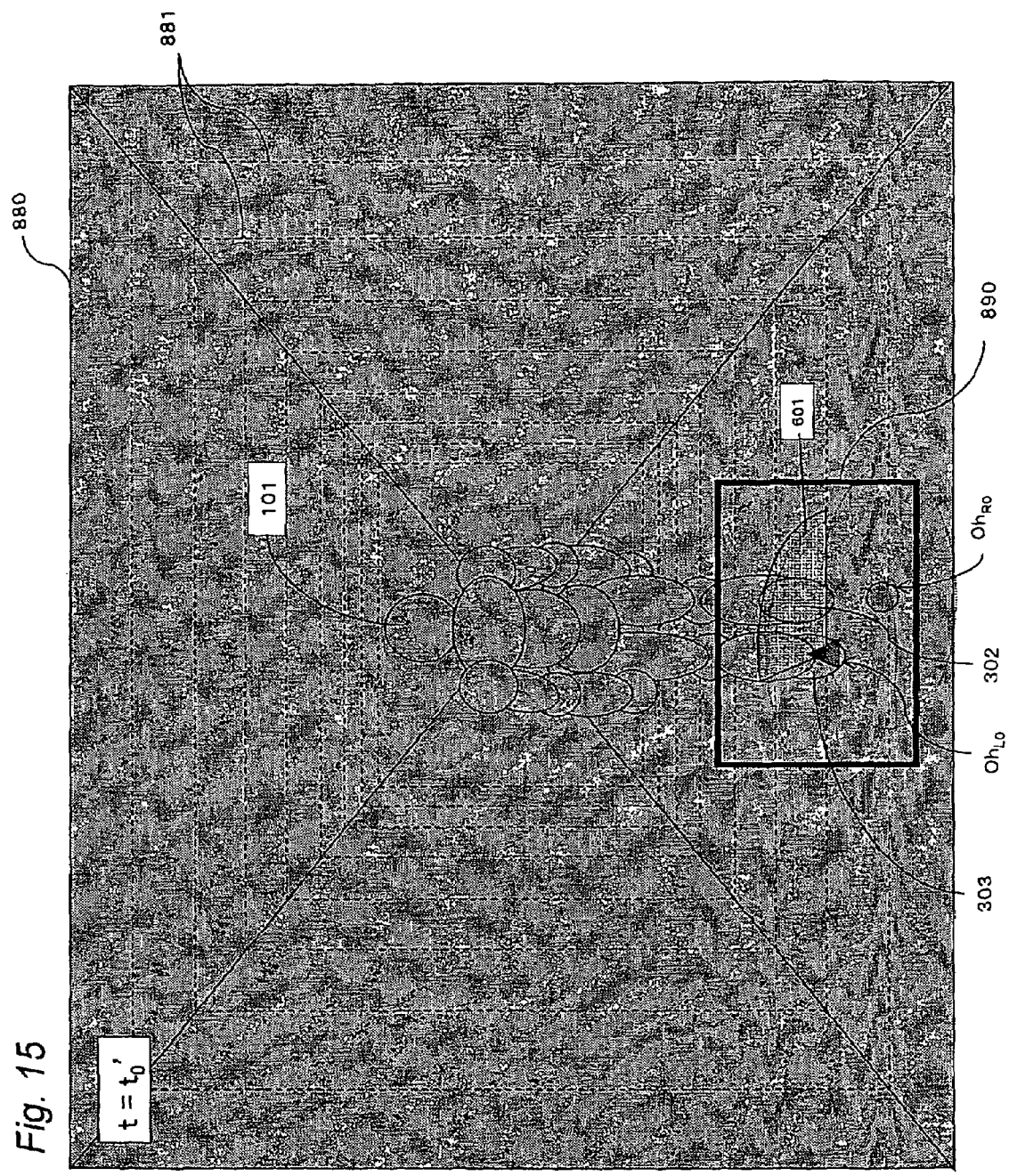
FIG. 15 is a view clearly showing a state where the whole predictive walking range in the normal walking state when $t=t_1$ is superimposed on FIG. 12 when $t=t_0'$ (state in which the right foot is lifted apart from the ground) by the walk tracking method by means of the walk tracking apparatus of the above embodiment.
Figure 16:
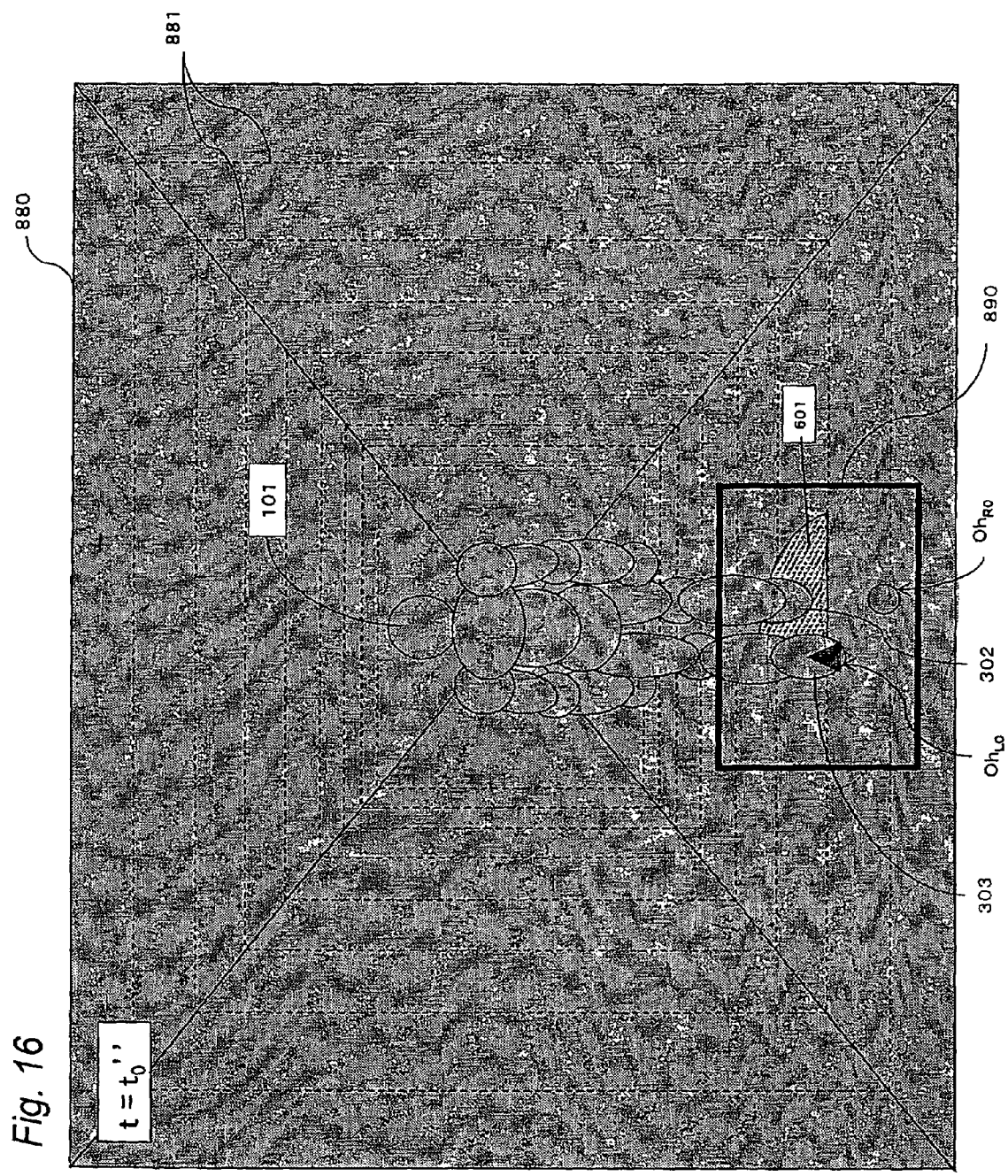
FIG. 16 is a view showing a state where the predictive walking range in the normal walking state when $t=t_1$ is superimposed on FIG. 12 when $t=t_0'$ (state in which the right foot is lifted before landing) by the walk tracking method by means of the walk tracking apparatus of the above embodiment.
Figure 18:
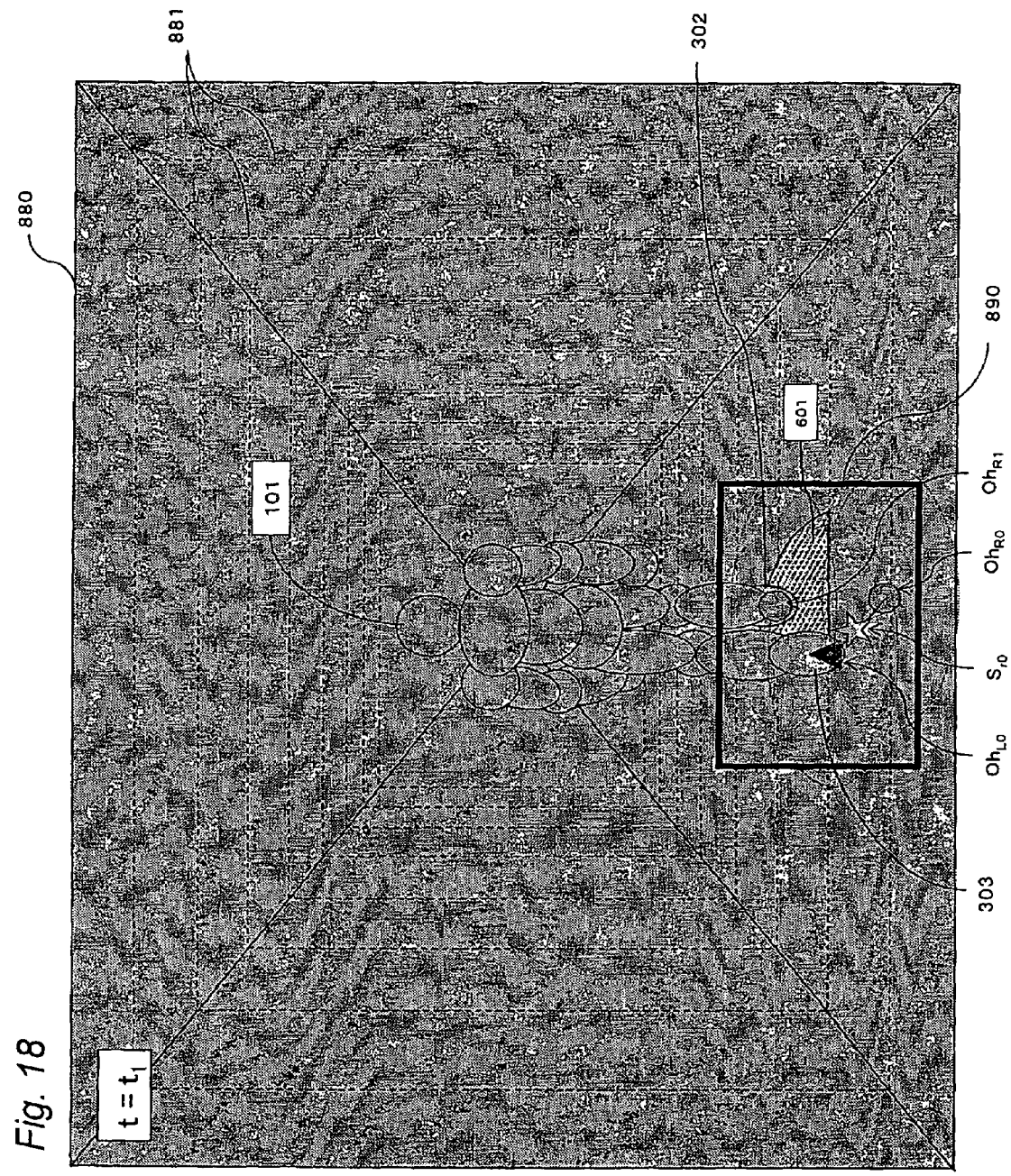
FIG. 18 is a view showing an image obtained by the camera in the normal walking state when $t=t_1$ (state of FIG. 17, i.e., state in which the right foot is landed) and the image region, to which attention is paid, in the image by the walk tracking method by means of the walk tracking apparatus of the above embodiment.

FIG. 12 is a view showing an image 880 obtained by the camera 103*a* in the walking start state when $t=t_0$ (state of FIG. 10, i.e., state in which both feet are landed) and an image region 890, to which attention is paid, in the image 880. It is noted that the dashed quadrangular frames 881 in the image 880 are added to the image after measurement in order to measure a distance between the mobile unit 301 and the objective person 101. The same thing can be said for the other figures. FIGS. 14 and 15 are views showing the predictive walking range in the normal walking state when $t=t_1$ superimposed on FIG. 12 when $t=t_0'$ (state in which the right foot 302 of the objective person 101 is lifted apart from the ground). It is noted that FIG. 15 shows the same state as that of FIG. 14 and shows the whole predictive walking range. FIG. 16 is a view showing the predictive walking range in the normal walking state when $t=t_1$ superimposed on FIG. 12 when $t=t_0''$ (state in which the right foot is lifted before landing). FIG. 18 is a view showing the image 880 obtained by the camera 103*a* in the normal walking state when $t=t_1$ (state of FIG. 17, i.e., state in which the right foot is landed) and the image region 890, to which attention is paid, in the image 880. In this case, it is assumed $t_0<t_0'<t_0''<t_1$. Moreover, $Sr_0$ is the movement target of the mobile unit 301 and herein allowed to have the position coordinates of the midpoint between the position coordinates $Oh_{R0}$ of the right foot 302 and the position coordinates $Oh_{L0}$ of the left foot 303.

Objective Person Specifying Process: Step S100

The step S100 of the process for specifying the objective person 101 is described in detail with reference to the flow chart of FIG. 3 and FIGS. 10, 11, and 12.

First of all, the data of the objective person 101 to be accompanied by the mobile unit 301 is inputted to the objective person storage part 112, the walking state obtainment part 105, and the objective person discrimination part 114 of the tracking unit 1000 from the objective person measurement device 103 or the input device 901 of the key, mouse, voice input, or the like (step S101) At this time, when the objective person measurement device 103 of the tracking unit 1000 equipped for the mobile unit 301 has a sensor part provided by, for example, the camera 103a for image-inputting use, in order to allow the objective person 101 to be recognized by the camera 103a (so as to locate the objective person 101 within the initially set reference range of the camera 103a on the image), it is required that the objective person 101 is located just in front of the mobile unit 301 as shows in FIG. 11. Therefore, when the objective person 101 is located in a position other than in front of the mobile unit 301, it is acceptable to move the objective person 101 in front of the mobile unit 301 or move the mobile unit 301 so that the objective person 101 becomes located in front of the mobile unit 301. In this case, the reference range is the range in which the pixel coordinates of the image come to have the prescribed coordinates when converted into the two-dimensional coordinates (e.g., the image range 890, to which attention is paid, of FIG. 12).

The data of the objective person 101 inputted from the camera 103a of the objective person measurement device 103 is exemplified as the image data of the whole body or the lower half of the body of the objective person 101 as shown in FIG. 12. Moreover, besides this, the data of the objective person 101 inputted from the input device 901 may include information that can identify the person, such as the physical features (face, figure, shoes size, etc.) of the objective person 101, the features of shoes and clothes (color, size, and shape of the shoes, color, size, and shape of clothes, etc.), data of the walking state (footstep etc.), and so on. It is acceptable to preparatorily store these data in the objective person storage part 112 of the tracking unit 1000 or a database outside the objective person storage part 112 and use the data by reading the data from the database.

The objective person discrimination part 114 determines whether or not the objective person 101 has been able to be specified by the inputted data (step S102). That is, when the objective person 101 has not been able to be specified because of shortage of data, notification of the failure in specifying the objective person is made by a display on the display device 902, issuing a warning sound or by other means (step S105), and thereafter, the program flow returns to step S101.

When the objective person 101 has been able to be specified in step S102, the objective person 101, who has been able to be specified, is displayed on the display device 902 (step S103).

Next, the objective person discrimination part 114 determines whether or not the objective person 101 himself or herself has confirmed the information displayed on the display device 902 (step S104). When the objective person 101 has confirmed the information displayed on the display device 902 (e.g., when a voice input or an input from the input device 901 of a key input or the like of the confirmation is made within a prescribed time), the program flow proceeds to the walking state data obtainment process of the objective person 101 (step S200). When the objective person 101 has not confirmed the displayed information, the program flow returns to step S101 to perform again the data input of the objective person 101. During the confirmation, the objective person 101 may correct the information displayed on the display device 902 from the input device 901.

Objective Person Walking State Data Obtainment Process: Step S200

The step S200 of the walking state data obtainment process of the objective person 101 is described in detail with reference to the flow chart of FIG. 4 and FIG. 13 and so on.

The objective person measurement device 103 measures the information of the walking state 102 of the objective person 101 (step S201).

Next, the information of the walking state 102 measured in step S201 is inputted as a part of the objective person data 106 to the walking state obtainment part 105, the objective person storage part 112 and the objective person discrimination part 114 (step S202). In this case, examples of the data to be inputted include the image data of the walking state of the objective person 101, position information of both feet (below the heels) of the objective person 101, footstep data thereof, and so on.

Next, the walking state obtainment part 105 calculates the walking state data 108 on the basis of the data inputted to the walking state obtainment part 105 in step S202, and the calculated walking state data 108 is stored in the objective person storage part 112 and inputted to the walking state determination part 109 (step S203). In this case, examples of the walking state data 108 include the barycentric coordinates at the feet below the heels of the objective person 101 and may otherwise include the features of walking such as the footstep and the walking cycle of the objective person 101.

Next, the walking state obtainment part 105 calculates the predictive walking range 601 of the objective person 101 on the basis of the footstep data of the objective person 101 (footstep data of an ordinary person when there is no footstep data of the objective person 101) (step S204). According to the footstep data preset in the tracking unit 1000, the predictive walking range 601 may be a sectorial range of an angle within a range of 100 degrees to 120 degrees having a radius R calculated by the following expression (1) from the footstep centered on the coordinates of the pivot foot of the objective person 101 with respect to a reference of a line segment (line segment $Oh_{L0}Fs$ in FIG. 13) perpendicular to a straight line $Oh_{R0}Oh_{R1}$ of a length R on a direction opposite to the pivot foot side and passing through the pivot foot $Oh_{L0}$ as shown in FIG. 13. Within the range as described above, the foot will land almost within the range in the case of a normal walking motion. That is, the predictive walking range in this case is the range in which the foot lands within the range in almost all the cases when the objective person 101 makes a normal walking motion. When the objective person 101 has a habitual tendency of tottering even if he or she is going to make a normal walking motion, it is proper to make the sectorial range have a wider angle or set a larger radius.

The predictive walking range 601 in FIGS. 13, 14, 15, 16, and 17 is the predicted range of position coordinates $Oh_{R1}$ of the right foot 302 when $t=t_1$ predicted from the position coordinates $Oh_{R0}$ and $Oh_{L0}$ of both feet 302 and 303 when $t=t_0$. The predictive walking range 602 in FIGS. 19, 20, and 21 is the predicted range of the position coordinate $Oh_{L1}$ of the left foot 303 when $t=t_2$ predicted from the position coordinates $Oh_{R1}$ and $Oh_{L0}$ of both feet 302 and 303 when $t=t_1$. The predictive walking ranges 601 and 602 become roughly perpendicular to a straight line that connects the current (at the latest time) (e.g., time $t=t_0$) pivot foot position with the past (e.g., time $t=t_{-1}$) pivot foot position at one step short of the walk and have a sectorial shape that has a radius R of an angle of not greater than 180 degrees of the footstep of the objective person 101 with respect to a reference of a half line drawn from the pivot foot position inwardly of the body of the objective person 101.

In a case where generation of a sudden movement of the objective person 101 is predicted, for example, when an obstacle is detected in the image picked-up from the camera, the angle of the predictive walking range predicting at that time may temporarily be 180 degrees. Here, a case where an obstacle is a moving matter or a case where the objective person 101 does not become aware of an obstacle is conceivable as a case where occurrence of a sudden movement of the objective person 101 is predicted. In general, it is difficult to predict a sudden movement of the objective person 101, and thus, it is preferable to increase the angle of the predictive walking range. It is not preferable to increase the predictive walking range in its radius direction without changing the angle because it is feared that the movable unit 301 might be suddenly accelerated to collide with the objective person 101.

When it is discriminated that a foot of the objective person 101 is frequently fallen out of the predictive walking range because of frequent occurrence of a sudden movement of the objective person 101 or the like in a case where there is a difference between a person such as an otherly-abled lame of a leg and an able-bodied person in walking state, the following manner is carried out. That is, in addition to an otherly-abled mode for carrying out the tracking motion based on the predictive walking range, a non-otherly-abled mode for carrying out a tracking motion based on a predictive walking range wider than the predictive walking range of the otherly-abled mode or having a wider angle than the angle of the predictive walking range of the otherly-abled mode is stored in the walking state storage part 107. Then, the one of the two modes can be switched with the other based on the input from the input device or the like or historical information that a number of times the foot is fallen out of the predictive walking range exceeds a specified number of times. According to the above construction, the predictive walking range can be set for the objective person 101 in the more suitable manner.

The sectorial angle is calculated by the following expression (2), and the footstep may be set by, for example, a method for extracting the height of the obtained data of the objective person 101 and being calculated from the following expression (3). In FIG. 13, the reference numeral 610 denotes a semicircular maximum predictive walking range, which is located on the front side of the objective person 101 centered on the left foot 303 of the objective person 101 and perpendicular to a straight line $Oh_{R0}Oh_{R1}$ that connects the position coordinates before and after the movement of the right foot 302 and includes a line segment (straight line along the line segment $Oh_{L0}Fs$) that passes through the position coordinates of the left foot 303. The sectorial predictive walking range 601 is within the maximum predictive walking range 610.

$$\text{Footstep} \times 1.2 \leq \text{radius } R \leq (\text{footstep}+\text{shoes size}) \times 1.2 \quad (1)$$

$$90 \leq \angle FsOh_{L0}Fe \leq 180 \text{ (degrees)} \quad (2)$$

$$\text{Height} \times 0.37 \leq \text{footstep} \leq \text{height} \times 0.45 \quad (3)$$

The footstep of height×0.37 is the footstep during normal walking, and the footstep of height×0.45 is the footstep during walking faster than usual.

Next, it is determined whether or not the objective person 101 has taken one step forward within a prescribed time (step S205) as described later in FIG. 8. In concrete, it is proper to measure the information of the walking state 102 of the objective person 101 by the objective person measurement device 103 and to determine whether or not the position of the heel of either foot of the objective person 101 has changed in the walking state obtainment part 105. When it is determined that the objective person 101 has not taken one step forward within the prescribed time in step S205, the program flow returns to step S201 or step S203 assuming that the person has no intention to walk. That is, the program flow returns to step S201 in the case of redo from the measurement or returns to step S203 when the calculation is redone with the measurement kept as it is.

When it is determined that the objective person 101 has taken one step forward within the prescribed time in step S205, it is determined whether or not the position of the foot that has stepped forward has been within the predictive walking range 601 (step S206). When it is determined that the position of the foot that has stepped forward has not been within the predictive walking range 601 in step S206, the walking state obtainment part 105 corrects the footstep, angle, or the like (step S212), and thereafter, the program flow returns to step S201 or step S203. That is, the program flow returns to step S201 in the case of redo from the measurement or returns to step S203 when the calculation is redone with the measurement kept as it is. However, it is acceptable to assume that the objective person 101 has lost his or her balance and stop the movement of the mobile unit 301 as in steps S809 and S810 of FIG. 9 described later instead of correcting the footstep, angle, or the like by the walking state obtainment part 105.

When it is determined that the position of the foot, which has stepped forward in step S206, is within the predictive walking range 601, the objective person measurement device 103 measures a distance between the objective person 101 and the mobile unit 301, and the movement commanding part 117 determines whether or not the distance has exceeded the tracking start distance (e.g., 1 m) (step S207).

When it is determined that the distance has not exceeded the tracking start distance in step S207, the movement commanding part 117 determines whether or not the tracking has already started (for example, a walk vector 111 of a speed of non-zero has already outputted.) (step S210). When it is determined that the tracking has already started in step S210, the movement (tracking motion) of the mobile unit 301 is stopped assuming that the mobile unit 301 has come excessively close to the objective person 101 (step S211), and the series of processing ends.

When it is determined that the tracking has not already started in step S210, the program flow returns to step S201 or step 5203. That is, the program flow returns to step S201 in the case of redo from the measurement or returns to step S203 when the calculation is redone with the measurement kept as it is.

When it is determined that the distance has exceeded the tracking start distance in step S207, it is determined whether or not the objective person 101 has taken two or more steps from the start of walking based on the walking state data 108 stored in the walking state storage part 107 (step S208). When it is determined that the person has not taken two or more steps from the start of walking in step S208, the series of processing ends as it is.

When it is determined that the person has taken two or more steps from the start of walking in step S208, the walking state obtainment part 105 corrects the footstep on the basis of the footstep data that have been stored by that time (step S209), and thereafter, the program flow proceeds to the process of confirming the objective person 101 (step S300). This is because the footsteps can be averaged if two or more steps have been taken from the start of walking.

The step S205 of the process for determining whether or not the objective person 101 has taken one step within the prescribed time or, in other words, a process for recognizing the start of walking is described in detail with reference to FIG. 8.

For example, a method for recognizing the start of walking in the case where the sensor part is the camera 103a for image-inputting use is described with reference to FIG. 8.

First of all, in the objective person measurement device 103, both feet of the objective person 101 are subjected to a matching process from images that have been obtained by the camera 103a and undergone image processing in the image processing part 103b, in the walking state obtainment part 105 (step S701). The images of both feet of the objective person 101, which serve as a reference for the matching, have preparatorily been obtained by the camera 103a.

Next, the walking state obtainment part 105 obtains the barycentric coordinates on the image of both feet tracked by the matching (step S702).

Further, the walking state obtainment part 105 converts the barycentric coordinates onto the two-dimensional coordinates with respect to the reference of the mobile unit 301 described in FIG. 1B (step S703).

Next, the barycentric coordinates of the foot on the right side of the objective person 101 and the barycentric coordinates of the foot on the left side among both feet of the objective person 101 on the two-dimensional coordinates are assumed to be $Oh_{RO}(X_{RO}, Y_{RO})$ and $Oh_{LO}(X_{LO}, Y_{LO})$, respectively in the walking state obtainment part 105 (step S704). It is noted that the right-hand side and the left-hand side are reversed depending on the direction of the objective person 101. Therefore, it is assumed that the positional relation between the mobile unit 301 and the state in which the objective person 101 faces the same direction as that of the mobile unit 301 (state in which the front of the mobile unit 301 faces the back of the objective person 101) and the state of the objective person 101 whose both feet can be recognized is assumed to be the relation that can be subjected to the objective person specifying process of FIG. 3.

Next, the walking state obtainment part 105 determines whether or not the coordinates of either one of both feet change within 0.1 seconds (step S705).

When it is determined that the coordinates of either one of both feet have changed within 0.1 seconds in step S705, the walking state obtainment part 105 determines that the objective person 101 has started walking (step S706), and the processing ends.

When it is determined that the coordinates of either one of both feet have not changed within 0.1 seconds in step S705, the walking state obtainment part 105 determines that the objective person 101 is not walking but stopped, and the program flow returns to step S705 to await the start of walking of the objective person 101.

The step S206 of the process for determining whether or not the position of the foot that has stepped forward has been within the predictive walking range or, in other words, a walking prediction process after the start of walking is described with reference to FIG. 9.

The walking state obtainment part 105 determines that the foot of which the coordinates have not changes for 0.1 seconds or more is the pivot foot among the barycentric coordinates of both feet of the objective person 101 (step S801).

The walking state obtainment part 105 determines whether or not the barycentric coordinates of the foot that has moved exist (step S802).

When it is determined that the barycentric coordinates of the foot that has moved exists in step S802, the walking state obtainment part 105 determines whether or not the position of the barycentric coordinates of the foot that has moved is located within the predictive walking range 601 (step S803).

When it is determined that the position of the barycentric coordinates of the foot that has moved in step S803 is located within the predictive walking range 601, the walking state obtainment part 105 determines that the walking state is normal (step S804).

Next, the program flow proceeds from step S207 to step S208 or the like, the walking state obtainment part 105 predicts the predictive walking range of the foot that is to move next (step S805), and the processing ends.

Figure 22:
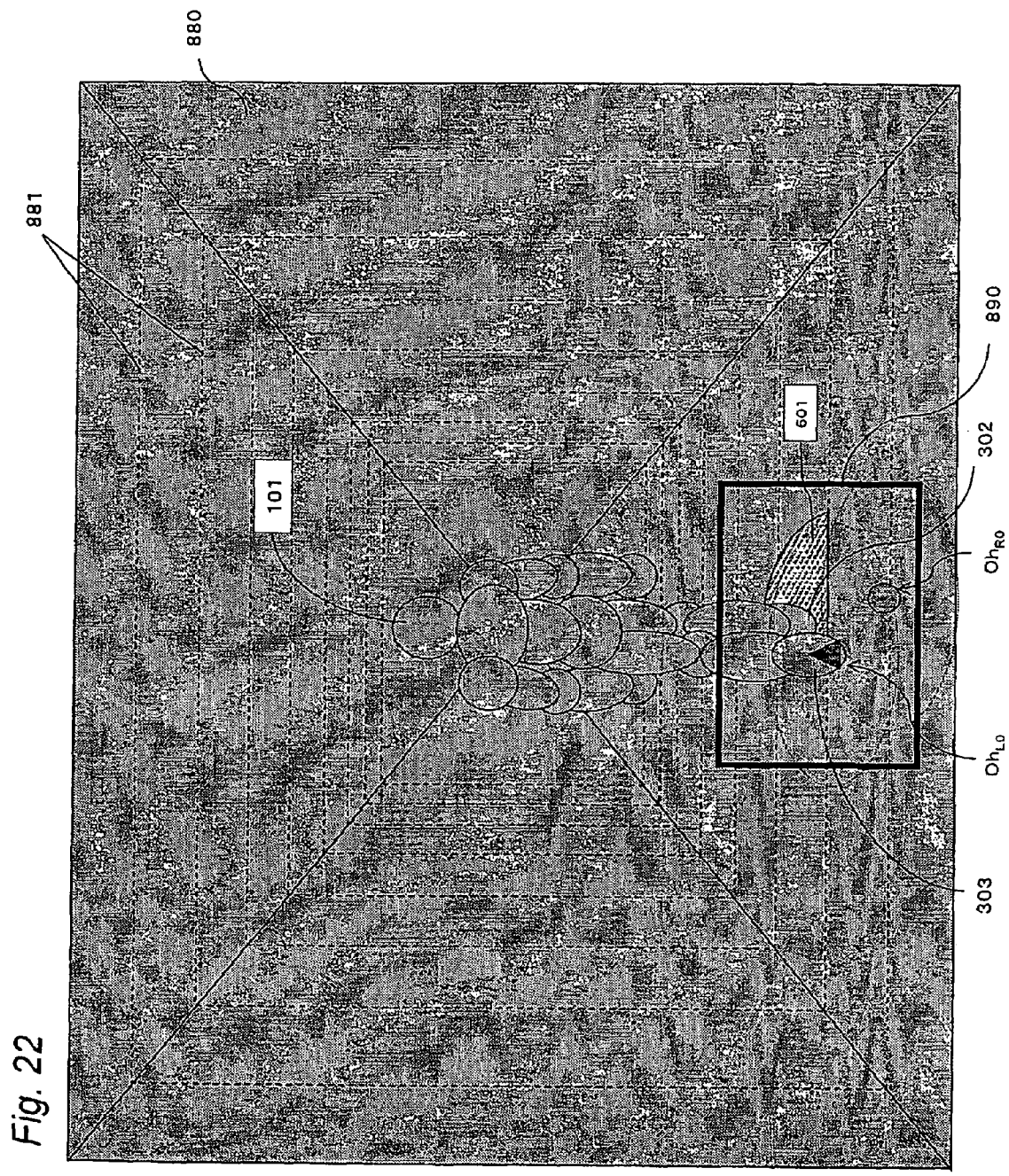
FIG. 22 is an explanatory view showing a state in which the right foot of the objective person is about to land in an overlapping manner ahead of the left foot.
Figure 23:
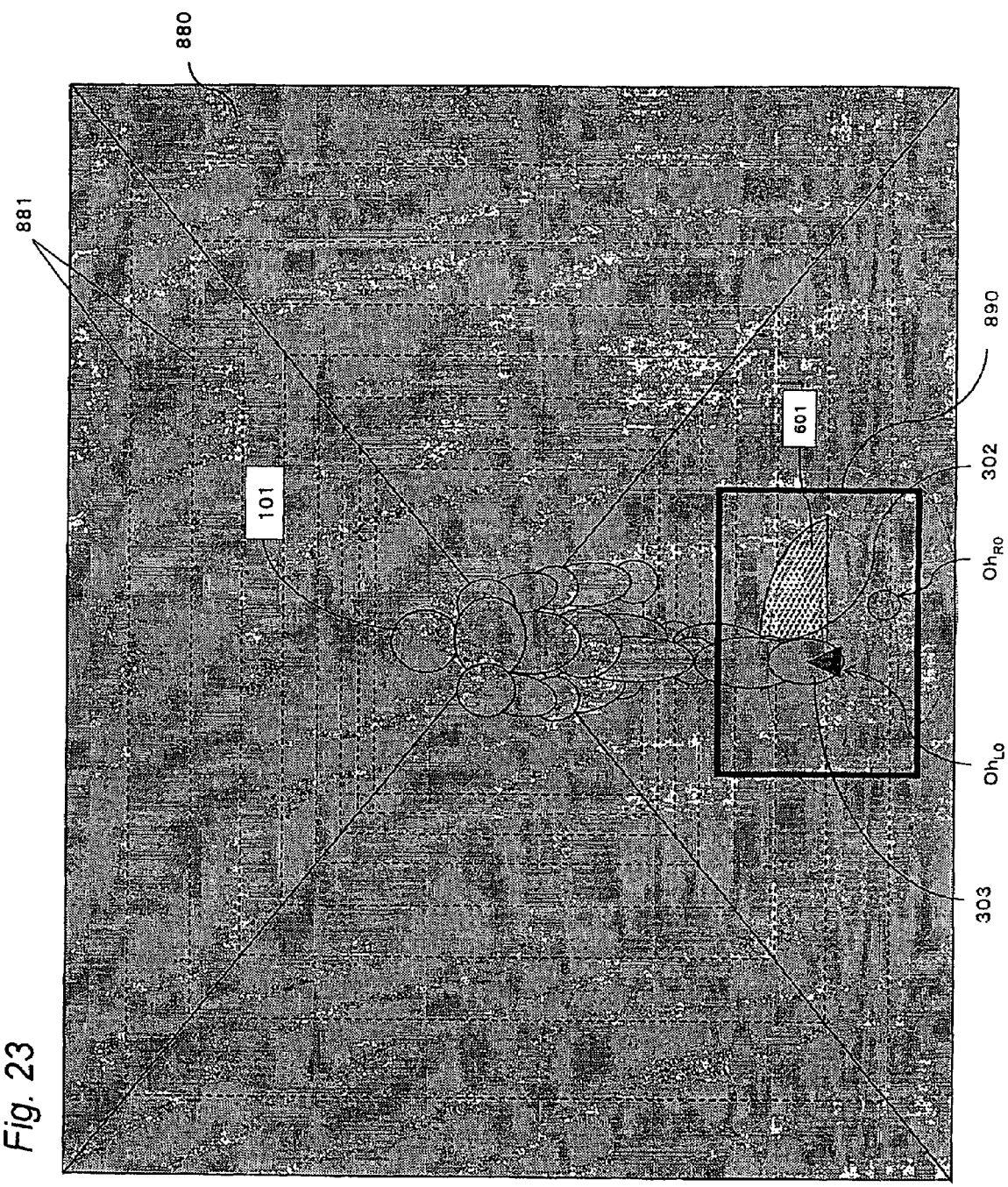
FIG. 23 is an explanatory view showing a state in which the right foot of the objective person has landed in an overlapping manner ahead of the left foot.

When it is determined that the coordinates of the foot that has moved in step S802 do not exist on the obtained image, the walking state obtainment part 105 determines that the feet overlap each other (step S806) For example, when the right foot has landed so as to forwardly overlap the left foot as shown in FIGS. 22 and 23, a state as shown in FIG. 23 results on the image 880 of the camera 103a.

Subsequently to step S806, for example, assuming that the left foot 303 is the current pivot foot (A) and the right foot 302 is moved to be the next pivot foot (B), then the walking state obtainment part 105 predicts that the position of the right foot 302 that is the next pivot foot (B) is located in a position advanced by the footstep from the left foot 303 of the current pivot foot (A) on a half line that passes from the mobile unit 301 through the left foot 303 of the current pivot foot (A)(step S807).

Subsequently to step S807, the walking state obtainment part 105 determines whether or not the right foot 302 of the pivot foot (B) is located in the predicted position when the left foot 303 of the pivot foot (A) is moved (step S808).

When it is determined that the right foot 302 of the pivot foot (B) has been located in the position predicted in step S808, the program flow proceeds to step S805, and the walking state obtainment part 105 predicts the predictive walking range of the left foot 303 that is to move next.

When it is determined that the right foot 302 of the pivot foot (B) has not been located in the position predicted in step S808, the walking state obtainment part 105 outputs a walk vector 111 of a speed of zero and an angle of zero degrees, making it possible to stop the mobile unit 301 via the movement commanding part 117 and the driving part 119 of the mobile unit 301 (step S810).

Moreover, when it is determined that the position of the foot that has moved in step S803 has been located outside the predictive walking range, the walking state obtainment part 105 determines that the objective person 101 is loosing his or her balance (step S809), and then, the program flow proceeds to step S810. As described above, the walking state obtainment part 105 outputs the walk vector 111 of the speed of zero and the angle of zero degrees so as to stop the mobile unit 301 via the movement commanding part 117 and the driving part 119 of the mobile unit 301 (step S810).

Figure 24:
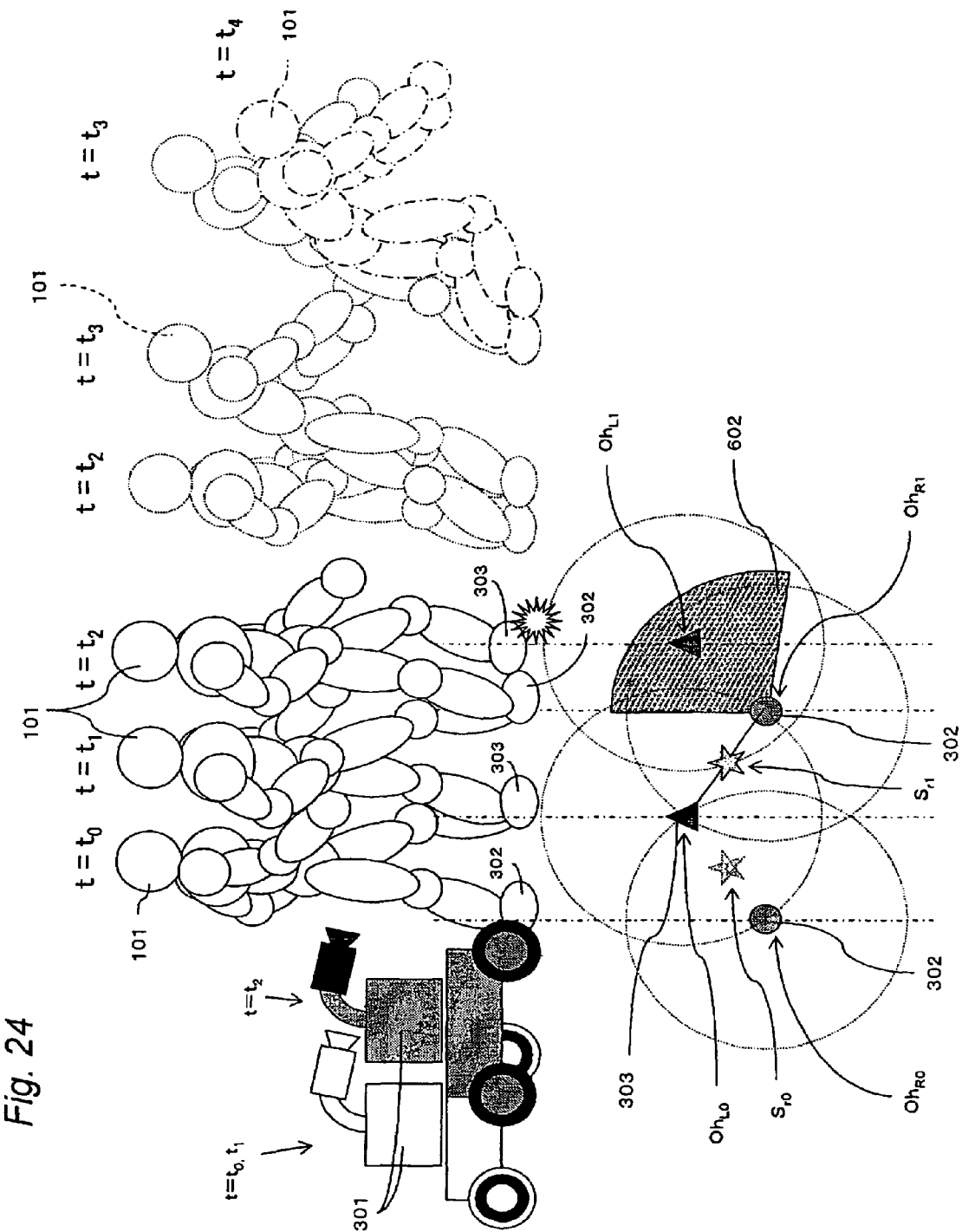
FIG. 24 is an explanatory view showing a case where the left foot of the objective person stumbles with something when $t=t_2$, the objective person starts tumbling when $t=t_3$, and the objective person tumbles when $t=t_4$ and falls on both his or her hands.

In this case, as shown in FIG. 24, it is assumed that the left foot 303 has stumbled with something when $t=t_2$, the objective person 101 has started tumbling when $t=t_3$, the objective person 101 has tumbled and fallen on both his or her hands when $t=t_4$. It is noted that the two objective persons 101 when $t=t_2$ are identical, and the two objective persons 101 when $t=t_3$ are identical in FIG. 24. Since it becomes incomprehensive to make the movements of the objective person 101 when $t=t_2$ and when $t=t_3$ overlap the objective person 101 when $t=t_1$, they are shown shifted. As described above, when the objective person 101 has tumbled by stumbling with something, the position of the foot that has stumbled or the position of the foot that has moved after the stumbling are located outside the predictive walking range 602. Accordingly, when the walking state obtainment part 105 determines that the position of the foot that has subsequently moved has become located outside the predictive walking range 602, the walking state obtainment part 105 outputs the walk vector 111 of the speed of zero and the angle of zero degrees so as to stop the mobile unit 301 via the movement commanding part 117 and the driving part 119 of the mobile unit 301. As a result, the movement of the mobile unit 301 can be immediately stopped when the objective person 101 looses his or her balance and becomes unable to normally walk.

Since it is highly possible that the normal walking is redone after the stop, the program flow preferably returns to step S200 and await the start of walking. With this arrangement, the tracking operation of the mobile unit 301 can smoothly be restarted when the objective person 101 promptly stands up and starts normally walking even when the person temporarily tumbles as a consequence of stumbling.

Moreover, when there is no start of walking for a time longer than a prescribed time, it is acceptable to display the abnormality on the display device 902, issue a warning sound by means of a warning device, or in some cases, use a communication device when the communication device is provided and then output a warning signal to a prescribed device.

Figure 25:
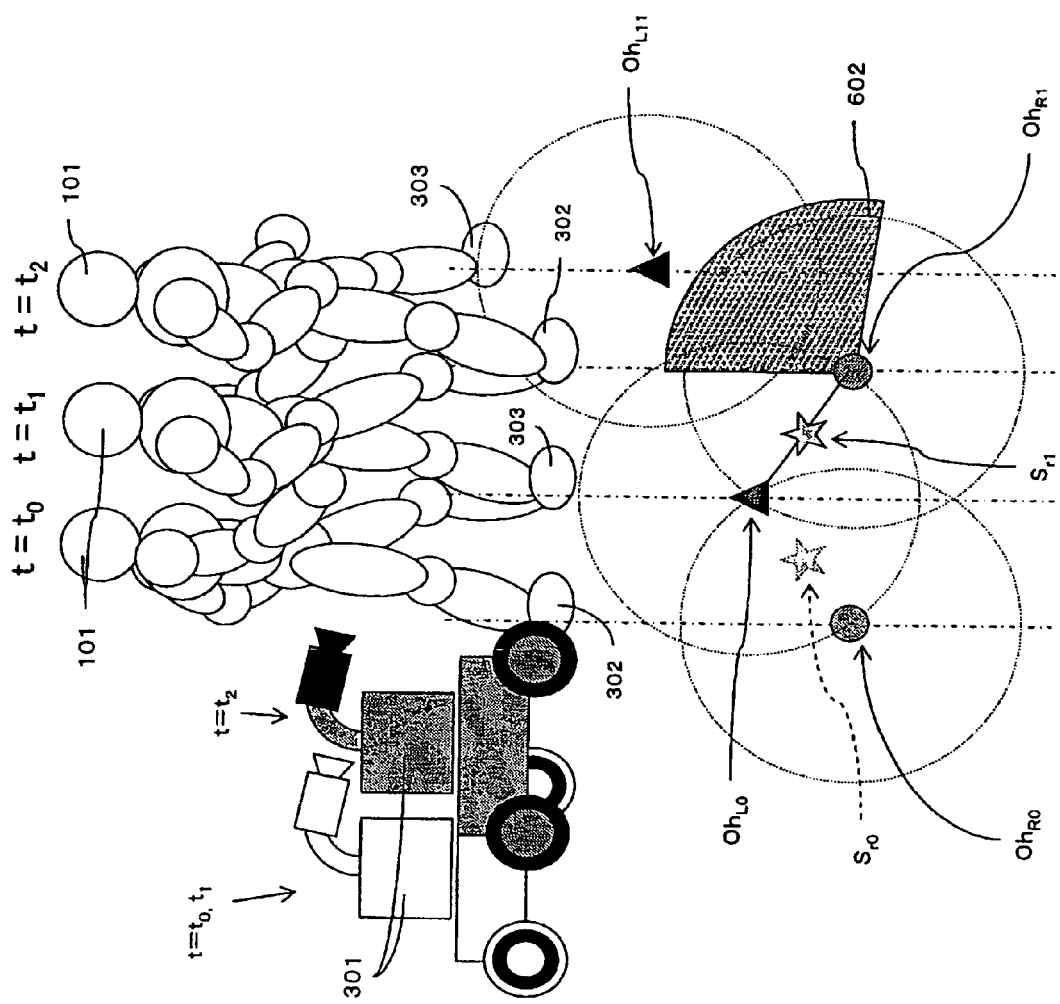
FIG. 25 is an explanatory view showing a case where the left foot has disadvantageously largely stepped sidewise and fallen out of the predictive walking range when $t=t_2$, as the result that the objective person has lost his or her balance or for another reason.

Moreover, when the left foot 303 has disadvantageously largely stepped sidewise when $t=t_2$ as a consequence of a loss of balance of the objective person 101 or for another reason and has fallen out of the predictive walking range 602 to a position $Oh_{L11}$ as shown in FIG. 25, the position of the foot that has moved is located outside the predictive walking range 602. Accordingly, when the walking state obtainment part 105 determines that the position of the foot that has subsequently moves has fallen out of the predictive walking range 602, the walking state obtainment part 105 outputs the walk vector 111 of the speed of zero and the angle of zero degrees so as to stop the mobile unit 301 via the movement commanding part 117 and the driving part 119 of the mobile unit 301. As a result, when the objective person 101 becomes unable to normally walk as a consequence of a loss of balance of the objective person 101 or the like, the movement of the mobile unit 301 can be promptly stopped.

Since it is highly possible that the normal walking is restarted after the stop, the program flow preferably returns to step S200 to await the start of walking. With this arrangement, the tracking operation of the mobile unit 301 can smoothly be restarted when the objective person 101 starts normally walking even when the person totters as a consequence of a loss of balance or the like.

Moreover, when there has been no start of walking for a time longer than a prescribed time, it is acceptable to display the trouble on the display device 902, issue a warning sound by means of a warning device, or in some cases, output a warning signal to a prescribed device by using a communication device according to circumstances when the communication device is provided.

Objective Person Confirmation Process: Step S300

The step S300 of the confirmation process of the objective person 101 is described in detail with reference to the flow chart of FIG. 7. objective person 101 has taken two or more steps from the start of walking (step S301). When it is determined that the objective person 101 has not taken two or more steps from the start of walking, the program flow stands by as it is until two or more steps are taken from the start of walking.

When it is determined the objective person 101 has taken two or more steps from the start of walking in step S301, the objective person data 106 when $t=t_0$ (e.g., at the present time) from the objective person measurement device 103 or the foot data 113 of the objective person 101 when $t=t_0$ (e.g., at the present time) calculated in the walking state obtainment part 105 is inputted to the objective person discrimination part 114. Moreover, the objective person storage data 115 when $t=t_1$ (e.g., in the past) stored in the objective person storage part 112 is also inputted to the objective person discrimination part 114 (step S302).

Next, the objective person discrimination part 114 compares the objective person data 106 or the foot data 113 of the objective person 101 with the objective person storage data 115 and determines whether or not they coincide with each other (step S303). It is assumed that the objective person storage data 115 is infallibly the objective person data 106 when $t=t_0$ (e.g., at the present time) or the foot data 113 of the objective person when $t=t_0$ (e.g., at the present time) or data of the same kind as that of both the data to be compared in the objective person discrimination part 114.

When no past data exists at the start of the processing, it is acceptable to use the objective person storage data 115 when $t=t_0$.

When it is determined that both the data coincide with each other in step S303, the objective person confirmation data 116 when $t=t_0$ (e.g., at the present time) is outputted from the objective person discrimination part 114 to the movement commanding part 117 (step S304), and thereafter, the program flow proceeds to the walking speed and angle calculation process of the objective person 101 (step S400). By outputting the objective person confirmation data 116, it can be confirmed that the objective person 101 who is currently being recognized is infallibly the previously measured objective person 101.

When it is determined that both the data are different from each other in step S303, a data obtainment error is displayed on the display device 902 (step S305), and the program flow returns to the walking state data obtainment process of the objective person 101 (step S200).

Objective Person Walking Speed And Angle Calculation Process: Step S400

The step S400 of the walking speed and angle calculation process of the objective person 101 is described in detail with reference to the flow chart of FIG. 6.

First of all, it is determined whether or not the objective person 101 has taken two or more steps from the start of walking (step S401). When it is determined that the objective person 101 has not taken two or more steps from the start of walking in step S401, the program flow stands by as it is until two or more steps are taken from the start of walking.

When it is determined that two or more steps has been taken from the start of walking in step S401, the walking state data 108 is outputted from the walking state obtainment part 105 and stored in the walking state storage part 107 (step S402).

Next, the walking state determination part 109 compares the walking state data 108 when $t=t_0$ (e.g., at the present time) inputted from the walking state obtainment part 105 with the walking state data 110 when $t=t_{-1}$ (e.g., in the past) stored in the walking state storage part 107, and calculates a difference between both the data (step S403). In this case, with regard to the footstep included in the walking state data 108, the mean value of the footsteps of the objective person 101 or an ordinary person may preparatorily be stored in the tracking unit 1000. Otherwise, the footstep may be calculated from the information of the height of the objective person 101 (it is acceptable to use, for example, the foregoing expression (3)) when the objective person 101 is recognized and specified (step S100). It is acceptable to calculate the information of the height of the objective person 101 from the image information or directly input the information from the input device 901 to the tracking unit 1000 for teaching.

When no past data exists at the start of the processing, the walking state data when $t=t_0$ may be used. Further, with regard to a method for calculating the walk vector 111 when no past data exists, it is acceptable to calculate the walk vector 111 from coordinates located near the mobile unit 301 among the data of the coordinates of the midpoint between both feet and the coordinates of both feet of the walking state data when $t=t_0$.

Next, the walking state determination part 109 calculates the walk vector 111 (speed and angle) from the difference calculated from the walking state data 108 and the walking state data 110 (step S404), and the program flow proceeds to the tracking process of the objective person 101 (step S500).

Objective Person Tracking Process: Step S500

The step S500 of the tracking process of the objective person 101 is described in detail with reference to the flow chart of FIG. 7.

First of all, the movement commanding part 117 determines whether or not the objective person confirmation data 116 and the walk vector 111 when $t=t_0$ (e.g., at the present time) have been inputted to the movement commanding part 117 (step S501). When it is determined that the objective person confirmation data 116 and the walk vector 111 when $t=t_0$ (e.g., at the present time) have not been inputted in step S501, the program flow returns to the walking state data obtainment process of the objective person 101 (step S200).

When it is determined that the objective person confirmation data 116 and the walk vector 111 when $t=t_0$ (e.g., at the present time) have been inputted in step S501, the movement commanding part 117 calculates the speed and angle of the mobile unit 301 from the walk vector 111 (step S502). In concrete, the position, which becomes the target of the movement of the mobile unit 301, is assumed to be located at, for example, the position coordinates of the midpoint between the position coordinates of the right foot 302 and the position coordinates of the left foot 303 of the objective person 101. Then, the speed and the angle relevant to the movement from the current position of the mobile unit 301 to the position coordinates of the midpoint are calculated.

Next, start of the tracking operation is displayed on the display device 902 from the movement commanding part 117 (step S503). As an example of the display on the display device 902, notification of the start of the tracking operation can be made by a vocal sound from a speaker as another example of the display device 902 besides the display of the start of the tracking operation on an LCD device.

Next, the movement command 118 is transmitted from the movement commanding part 117 of the tracking unit 1000 to the driving part 119 of the mobile unit 301 (step S504).

Next, the driving part 119 of the mobile unit 301 starts driving on the basis of the movement command 118, and the mobile unit 301 is moved or braked so that the mobile unit 301 tracks the objective person 101 while keeping a prescribed distance (minimum distance) to the objective person 101 (step S505).

Next, the movement commanding part 117 determines whether or not a command to end the tracking of the objective person 101 is inputted from the input device 901 or the like (step S506). When it is determined that the tracking ending command is not inputted in step S506, the program flow returns to the walking state data obtainment process of the objective person 101 (step S200). When it is determined that the tracking ending command is inputted in step S506, the program flow returns to the process for specifying the objective person 101 (step S100).

An example of the system that uses the tracking method and the tracking apparatus is described next with reference to FIGS. 26 through 27.

Figure 26:
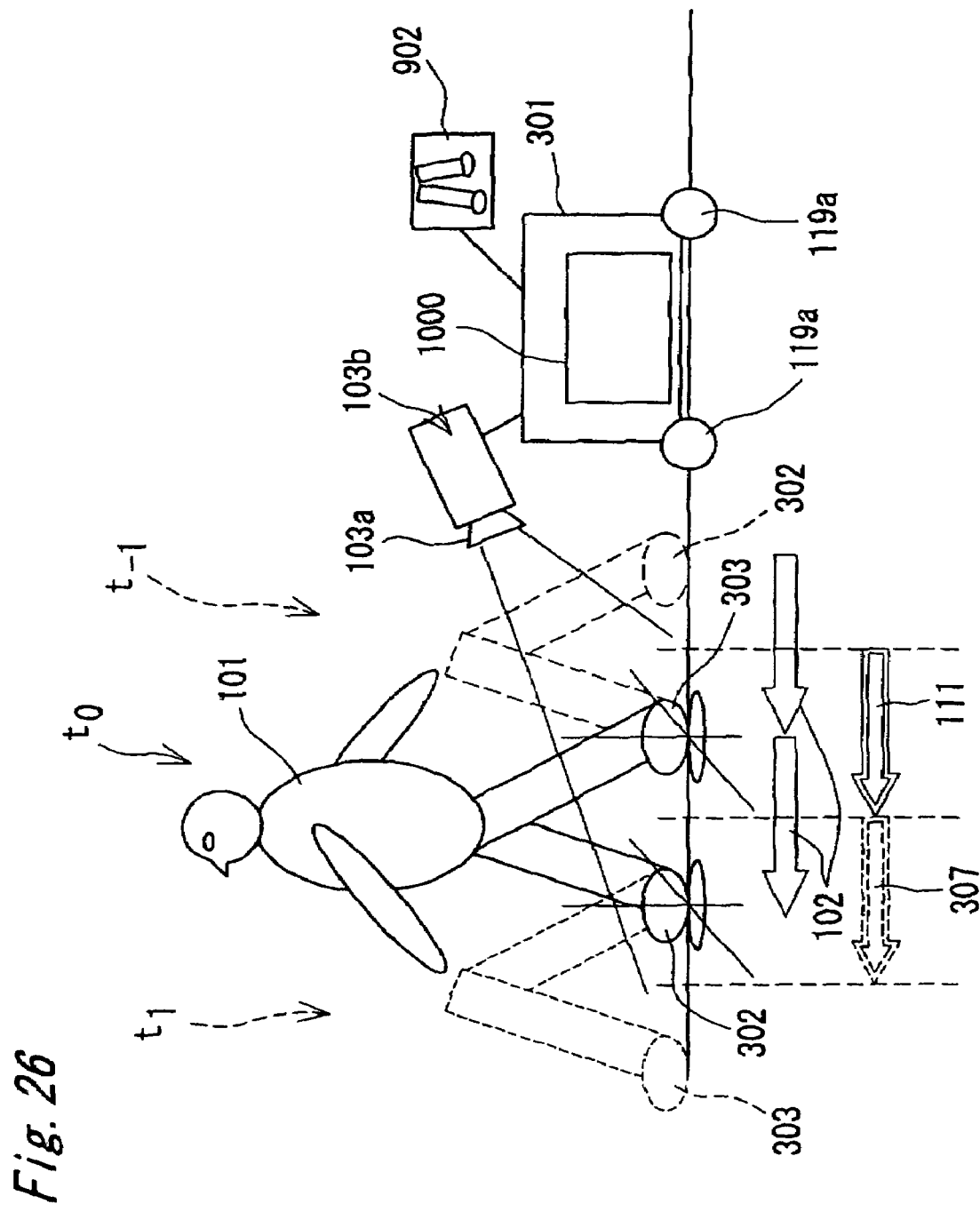
FIG. 26 is an explanatory view for explaining a concrete example of the automatic walk tracking method by means of the mobile unit equipped with the walk tracking apparatus of the above embodiment.

An example in which the mobile unit 301 tracks the objective person 101 is shown in the system shown in FIGS. 1 and 26. In this case, the motion control is made by the tracking unit 1000 so that the mobile unit 301 tracks the objective person 101 by using the information of the walking state 102 of the objective person 101.

The tracking unit 1000 first carries out the process for specifying the objective person 101 (step S100) That is, the images of both feet (the right foot of the objective person 101 is denoted by reference numeral 302, and the left foot is denoted by reference numeral 303) of the objective person 101 are obtained by the camera 103a and the image processing part 103b as the objective person measurement device 103, and the coordinates of both feet 302 and 303 are two-dimensionally measured.

The objective person measurement device 103 may obtain signals of both feet 302 and 303 transmitted from the signal transmitters provided separately for both feet 302 and 303 of the objective person 101 by means of a signal receiver and measure the respective coordinates by using the information of both feet 302 and 303 of the objective person 101.

Moreover, it is possible to confirm whether the objective person 101 is correctly determined by displaying the images or information of the right foot 302 and the left foot 303 of the objective person 101 on the display device 902 of a display or the like. At this time, it is acceptable to perform positional correction and so on of the right foot 302 and the left foot 303 of the objective person 101 by an input from the input device 901 according to circumstances.

After the process for specifying the objective person 101 (step S100) ends to specify the objective person 101, the walking state data obtainment process for obtaining the walking state data of the objective person 101 (step S200) is carried out. That is, the information of the right foot 302 and the left foot 303 of the objective person 101 is stored as the objective person storage data 115 into a storage device 304. Then, the walking state determination part 109 calculates the predictive walking range 601 on the basis of the obtained information of the position coordinates of both feet 302 and 303 (as a reference of the coordinates, it can be considered to make, for example, the position of the mobile unit 301 or the walking state data when $t=t_0$ serve as a reference) and the walking state data 110 at the time of one preceding step, i.e., when $t=t_{-1}$ assuming that the present time $t=t_0$, and the start of walking of the objective person 101 is awaited. When walking is started, the predictive walking range 601 is predicted on the basis of the previously stored information until two or more steps are taken.

Next, when the walking state data obtainment process of the objective person 101 (step S200) ends as the result that the objective person 101 has taken two or more steps, the confirmation process of the objective person 101 (step S300) is started. That is, it is determined whether or not the objective person 101 to be tracked is identical to the objective person 101 specified first, and if they are identical, the walking speed and angle calculation process of the objective person 101 (step S400) is carried out for the start of tracking operation. When the person is not identical to the objective person 101 specified first, the tracking start operation is stopped. This is a process, in a case where another person enters between the objective person 101 and the mobile unit 301 after the end of the specifying process, for preventing the mobile unit 301 from erroneously tracking another person.

Next, the walk vector 111 is obtained by a calculation part as one example of the walking state obtainment part 105 in the walking speed and angle calculation process (step S400) of the objective person 101. Then, the information of the walk vector 111 is stored into the walking state storage part 107.

Next, when the objective person walking speed and angle calculation process (step S400) is ended, the objective person tracking process (step S500) is started. In the objective person tracking process (step S500), the movement command 118 is transferred from the movement commanding part 117 of the tracking unit 1000 to the driving part 119 of the mobile unit 301 by the objective person confirmation data 116 and the walk vector 111 when t=t₀, and the mobile unit 301 tracks the objective person 101 while keeping a prescribed distance (minimum distance) to the objective person 101 as described later. At this time, the position, which becomes the movement target of the mobile unit 301, is assumed to be located at, for example, the position coordinates of the midpoint between the position coordinates of the right foot 302 and the position coordinates of the left foot 303 of the objective person 101. Then, the speed and angle relevant to the movement from the current position of the mobile unit 301 to the position coordinates of the midpoint are calculated, and the driving part 119 of the mobile unit 301 is controlled to be driven on the basis of the calculated speed and angle. Subsequently, the process of forming the predictive walking range each time when the objective person 101 goes ahead by one step, confirming the landing of the foot within the predictive walking range, forming again the predictive walking range, and confirming the landing of the foot within the predictive walking range is continued. On the other hand, the driving part 119 of the mobile unit 301 is controlled to be driven to carry out the tracking operation toward the position coordinates of the midpoint between the position coordinates of the right foot 302 and the position coordinates of the left foot 303 of the objective person 101. As a result, the mobile unit 301 can smoothly track the objective person 101 who is walking as shown in FIGS. 26 and 27.

According to the embodiment, by detecting the information of the walking state of the objective person 101, detecting the walk vector 111 (in other words, the walking speed and the walking angle, i.e., the walking route(for example, walking direction of the objective person)) of the objective person 101, and predicting the predictive walking range of the objective person 101 on the basis of the detected information of the walking state, the walking speed, and the route, it is possible to execute control so as to move the mobile unit 301 along the walking route of the objective person 101 while confirming that the objective person 101 is walking within the predictive walking range.

With the above arrangement, the mobile unit 301 can be moved to track the objective person 101 even if the walking route of the person is variously changed. Therefore, the mobile unit 301 becomes able to easily reliably track the movement route of the objective person 101 regardless of the sudden movement for tracking the objective person 101.

For example, when an obstacle suddenly appears ahead of the objective person 101 or when an obstacle approaches the objective person 101, it can be considered a case where the objective person 101 suddenly steps back or suddenly moves sideways. Moreover, it can be considered a case where the objective person 101 almost suddenly stumbles on something or largely totters. Even if such a sudden movement of the objective person 101 occurs, the mobile unit 301 can be moved along the walking route of the objective person 101 by predicting the predictive walking range of the objective person 101 or repredicting the predictive walking range when the prediction fails.

Moreover, when the walking state obtainment part 105 detects the position coordinates of both feet of the objective person 101, by determining that the foot having the position coordinates of the foot of the objective person 101 located in the same position for a time longer than a prescribed time (e.g., time longer than 0.1 seconds) is the foot that lands, a time point at which the foot securely lands on the ground can reliably be detected, and the position coordinates of the midpoint for calculating the position coordinates of the movement target of the mobile unit 301 are reliably obtained. From the information of the walking state of the objective person 101 as described above, it becomes possible to reliably calculate the movement speed and the movement route of the mobile unit 301 and stably control the movement of the mobile unit 301.

Moreover, when the objective person 101 moves back and the objective person 101 approaches the mobile unit 301 by a distance of not greater than the minimum distance as another sudden motion of the objective person 101, the mobile unit 301 can be prevented from colliding with the objective person 101 by promptly stopping the movement of the mobile unit 301.

Moreover, when it is determined that the coordinates of the moved foot of the objective person 101 does not exist on the obtained image 880, the walking state obtainment part 105 can predict the position coordinates of the feet by determining that the feet are overlapping, and the walking of the objective person 101 can reliably be predicted even when the feet are overlapping.

As one example of the method for making the mobile unit accompany the objective person and apparatus for making the mobile unit accompany the objective person according to another embodiment of the present invention, there is a method and apparatus for preceding the objective person (moving the movable unit ahead of the objective person). According to the method and apparatus for preceding the objective person of FIG. 28, an example in which the mobile unit 301 precedes the objective person 101 is shown. In this case, it is assumed that the mobile unit 301 precedes the person by using the information of the walking state 102 of the objective person 101. In other words, the mobile unit 301 moves consistently ahead of the objective person 101 along the route in which the objective person 101 is going to walk. The primary object for preceding is to have a sense of security for the objective person 101 by existence of the movable unit 301 that is always visible for the objective person 101. The method and apparatus for preceding the objective person basically has a structure and operation similar to those of the aforementioned method and apparatus for tracking the objective person and largely differs only in that the mobile unit 301 precedes the objective person 101.

In this case, the face of the objective person 101 is denoted by the reference numeral 401, and the right foot and the left foot are denoted by the reference numerals 302 and 303, respectively. The mobile unit 301 obtains the images of the face 401 and both feet 302 and 303 of the objective person 101 by means of the camera 103a and the image processing part 103b of the objective person measurement device 103, two-dimensionally measures the coordinates of both feet 302 and 303, and use the face 401 as information for recognizing (specifying) the objective person 101.

The object person measurement device 103 may obtain signals of both feet 302 and 303 transmitted from the signal transmitters provided separately for both feet 302 and 303 of the objective person 101 by means of a signal receiver, and measure the respective coordinates by using the information of both feet 302 and 303 of the objective person 101.

Moreover, it is acceptable to confirm the objective person 101 by displaying the images or information of the face 401, the right foot 302 and the left foot 303 of the objective person 101 on the display device 902 of a display or the like as in the objective person specifying process (step S100). At this time, it is acceptable to carry out positional correction and so on of the right foot 302 and the left foot 303 of the objective person 101 according to circumstances.

Then, the information of the right foot 302 and the left foot 303 of the objective person 101 is stored as walking state storage data into the walking state storage part 107 as in the objective person walking state data obtainment process (step S200). Moreover, the information of the face 401 of the objective person 101 is stored as objective person storage data 115 into the objective person storage part 112.

Then, as in the objective person confirmation process (step S300), the objective person walking speed and angle calculation process (step S400) and the objective person tracking processes (step S500), the walk vector 111 is calculated by the calculation device as the walking state obtainment part 105 provided for the tracking unit 1000 on the basis of the obtained information of the coordinates of both feet 302 and 303. Then, the information of the walk vector 111 is stored into the walking state storage part 107. The walking state determination part 109 forms the next predictive walking range by the walking state data 110 when $t=t_{-1}$ for one step before walking. In this case, with regard to the calculation method of the walk vector 111 when no past data exists in the objective person walking speed and angle calculation process in step 400, the walk vector 111 may be calculated from coordinates remote from the mobile unit 301 among the data of the coordinates of the midpoint of the coordinate data of both feet of the walking state data and the coordinates of both feet when $t=t_0$.

A method for determining the walking state data 108 and the walk vector 111 used for the control methods is described next with reference to FIG. 29.

In FIG. 29, the position information of the footprint of both feet (right foot 302 and left foot 303) of the objective person 101 when $t=t_0$ becomes the walking state data 108. It is further assumed that a line segment, which connects a midpoints 501 of both feet when $t=t_0$ with a midpoint 502 of both feet when $t=t_1$, is assumed to be the walk vector 111.

In FIG. 29, as the walking state data 108, the position coordinates of the positions of the right foot 302 and the left foot 303 when $t=t_0$ are assumed to be $Oh_{R0}$ and $Oh_{L0}$, and the position of the right foot 302 moved in a state in which the left foot 303 located at the position coordinates $Oh_{L0}$ is landed as the pivot foot when $t=t_1$ is assumed to be $Oh_{R1}$. Moreover, the position coordinates $Oh_{L1}$ of the left foot, the position coordinates $Oh_{R2}$ of the right foot, and the position coordinates $Oh_{L2}$ of the left foot are determined from the position $Oh_{R1}$ of the right foot 302, the position coordinates $Oh_{L1}$ of the left foot, and the position coordinates $Oh_{R2}$ of the right foot, respectively, with a lapse of time according to similar walking.

In this case, a line segment, which connects the position coordinates $Oh_{R0}$ at the position of the right foot 302 when $t=t_0$ with the position coordinates $Oh_{R1}$ at the position of the right foot 302 when $t=t_1$, is assumed to be the walk vector 111. It is acceptable to similarly obtain the walk vector 111 by using the left foot 303.

In this another embodiment, it is acceptable to predict the next predictive walking range from the direction of the toe of the footprint.

As described above, the predictive walking range can be limited by using the walking state data 108 as described above. When the positions of both feet are located outside the predictive walking range, the mobile unit 301 may temporarily stop or issue a warning by a sound, light, or the like determining that the objective person 101 has irregularly moved.

The walking state obtainment part 105 has a means for detecting the position coordinates of the foot of the objective person 101 located at the same position for a time longer than a prescribed time in detecting the positions of both feet and a means for storing the detected foot position coordinates data. Moreover, it is desirable to provide setting such that the foot is considered to be located at the same position when the time during which the foot is located at the same position is loner than 0.1 seconds (S>0.1 seconds) in determining the foot position coordinates. With the setting, the point of the midpoint is obtained when the foot securely lands on the ground, making it possible to stably predict the speed and the direction from the walking state data 108 on the basis of the tracking point.

Moreover, the state in which each foot lands can be detected when the foot position coordinates are located at the same position or the position within the prescribed tolerated range (range in which the objective person can be determined to be stamping or doing a similar motion instead of walking, or actually a range in which the person does not start walking as exemplified by a range of a circle having a radius $R_t$ from the position with the position coordinates of the detected foot, wherein the radius $R_t$ of the allowable range≦footstep×30% as the numerical example.) for a time greater than the prescribed time (longer than, for example, 0.1 seconds). Otherwise, it is acceptable to detect the landing by the image processing part when the state in which the sole is scarcely seen continues for a prescribed time whereas the foot is not landed when the sole is seen.

Moreover, it is acceptable to equip the objective person 101 with an apparatus of GPS or the like for transmitting position information and use the apparatus in combination with the present invention.

Moreover, the mobile unit may include an inverted two-wheeled or biped robot besides an inverted two-wheeled car and a four-wheeled car.

The method for making the mobile unit accompany the objective person and the apparatus for making the mobile unit accompany the objective person of the present invention are applied to a tracking method or a tracking apparatus for automatically tracking the objective person by means of the various mobile units for tracking the objective person and effective when provided in the tracking apparatus that is required to easily reliably track the movement route of the objective person in correspondence with sudden movement of the objective person.

Although attention is paid to the feet for tracking the objective person in the embodiments, the present invention is not limited to the feet, but attention can be paid to portions which can land on the ground or wheels of the movable object such as a robot or a wheel chair with marks attached to the wheels for serving as the heels of the feet for recognition.

The present invention can be applied to a movable object such as the objective person or animals (e.g. dog or cat).

By properly combining arbitrary embodiments of the various embodiments, the effects owned by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for making a mobile unit accompany an objective person for moving a mobile unit in correspondence with movement of the objective person, the method comprising:
    Detecting landing of a foot of the objective person;
    Detecting a walking direction of the objective person;
    Predicting a predictive walking stride of the objective person on a basis of detected information of the landing and direction of the foot;
    Predicting a predictive walking direction of the objective person on a basis of the landing of the foot and the predictive walking stride; and
    Executing control so that the mobile unit moves along the predictive walking direction of the observed person.

2. The method for making a mobile unit accompany an objective person as claimed in claim 1, wherein when it is detected that the foot of the objective person lands outside of the predictive walking stride control is executed so that the mobile unit stops moving, and
    thereafter, the foot landing of the objective person is detected again, the predictive walking stride of the objective person is predicted again, and the control is executed through the prediction and the detection of the foot landing within the predictive walking stride.

3. A method for making a mobile unit accompany an objective person for moving a mobile unit in correspondence with movement of an objective person, the method comprising:
    detecting landing of a foot of the objective person;
    detecting a walking direction of the objective person; and
    executing control so that the mobile unit moves along the walking direction of the objective person by predicting a predictive walking range of the objective person on a basis of detected information of the landing and the walking direction and detecting that the foot of the objective person lands within the predictive walking range through walking of the objective person,
    wherein the predictive walking range is a sectorial range directed along the walking direction and having a radius R calculated by a following expression from a footstep of the objective person centered on position coordinates of a landed foot of the objective person:

Footstep×1.2≦radius $R$≦(footstep+objective person's shoes size)×1.2.

4. The method for making a mobile unit accompany an objective person as claimed in claim 1, wherein, when the foot landing is detected, the objective person is discriminated, and position coordinates of both feet of the objective person are detected.

5. The method for making a mobile unit accompany an objective person as claimed in claim 1, wherein, when the foot landing is detected, both feet of the objective person are detected, and position coordinates of both feet of the objective person are detected.

6. The method for making a mobile unit accompany an objective person as claimed in claim 5, wherein, when the position coordinates of both feet are detected, the foot of the objective person located at same position coordinates for a time longer than a prescribed time is determined to be a landed foot, and position coordinates of the landed foot of the objective person are stored.

7. A method for making a mobile unit accompany an objective person for moving a mobile unit in correspondence with movement of an objective person, the method comprising:
    detecting landing of a foot of the objective person;
    detecting a walking direction of the objective person; and
    executing control so that the mobile unit moves along the walking direction of the objective person by predicting a predictive walking range of the objective person on a basis of detected information of the landing and the walking direction and detecting that the foot of the objective person lands within the predictive walking range through walking of the objective person, such that when the foot landing is detected, both feet of the objective person are detected and position coordinates of both feet of the objective person are detected, and when the position coordinates of both feet are detected, a foot of the objective person located at same position coordinates for a time longer than a prescribed time is determined to be a landed foot and position coordinates of the landed foot of the objective person are stored,
    wherein, when the foot of the objective person located at the same position coordinates for a time longer than the prescribed time is determined, the time during which the foot is located at the same position coordinates is set longer than 0.1 seconds.

8. The method for making a mobile unit accompany an objective person as claimed in claim 5, wherein, when the position coordinates of both feet are detected, the position coordinates of the foot of the objective person landed on a ground are detected, and the detected position coordinates of the foot of the objective person are stored.

9. The method for making a mobile unit accompany an objective person as claimed in claim 1, wherein, when the control is executed so that the mobile unit moves along the walking direction of the objective person, a mobile unit movement direction is determined by connecting a midpoint of a line segment that connects both feet of the objective person with a midpoint of a line segment that connects both feet of the objective person at a next step from already detected position information of both feet of the objective person, and the mobile unit is moved according to the determined direction.

10. The method for making a mobile unit accompany an objective person as claimed in claim 1, wherein, when the mobile unit is controlled to move, the mobile unit is made to move preceding the objective person.

11. The method for making a mobile unit accompany an objective person as claimed in claim 1, wherein, when the mobile unit is controlled to move, the mobile unit is made to move along the walking direction following the objective person.

* * * * *

UNITED STATES PATENT AND TRADEMARK OFFICE
CERTIFICATE OF CORRECTION

| | | |
|---|---|---|
| PATENT NO. | : 7,702,420 B2 | Page 1 of 1 |
| APPLICATION NO. | : 11/174667 | |
| DATED | : April 20, 2010 | |
| INVENTOR(S) | : Takanori Goto et al. | |

It is certified that error appears in the above-identified patent and that said Letters Patent is hereby corrected as shown below:

In column 27, claim 1, line 31, "observed" should read --objective--.

In column 27, claim 2, line 35, "stride control" should read --stride, control--.

Signed and Sealed this

Thirty-first Day of August, 2010

David J. Kappos
*Director of the United States Patent and Trademark Office*